US011778629B2

(12) United States Patent
Elshafie et al.

(10) Patent No.: US 11,778,629 B2
(45) Date of Patent: Oct. 3, 2023

(54) TECHNIQUES FOR DETERMINING RESOURCE ASSIGNMENTS FOR DECODE AND FORWARD RELAYING VIA DOWNLINK CONTROL INFORMATION

(71) Applicant: QUALCOMM Incorporated, San Diego, CA (US)

(72) Inventors: Ahmed Elshafie, San Diego, CA (US); Yi Huang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 17/483,942

(22) Filed: Sep. 24, 2021

(65) Prior Publication Data

US 2022/0104248 A1    Mar. 31, 2022

Related U.S. Application Data

(60) Provisional application No. 63/083,849, filed on Sep. 25, 2020.

(51) Int. Cl.
*H04W 72/14* (2009.01)
*H04W 72/23* (2023.01)
*H04L 1/1867* (2023.01)
*H04W 72/121* (2023.01)
*H04W 72/542* (2023.01)

(52) U.S. Cl.
CPC .......... *H04W 72/23* (2023.01); *H04L 1/1896* (2013.01); *H04W 72/121* (2013.01); *H04W 72/542* (2023.01)

(58) Field of Classification Search
CPC .......... H04B 7/15542; H04W 72/1263; H04W 88/04; H04W 40/22; H04W 72/54; H04W 72/20; H04W 72/23; H04W 72/121; H04W 72/542; H04L 47/30; H04L 1/1864; H04L 5/0044; H04L 5/0055; H04L 1/1861; H04L 1/1893; H04L 1/1896; H04L 5/0094; H04L 2001/0093
See application file for complete search history.

(56) References Cited

U.S. PATENT DOCUMENTS

| 8,964,664 B2 * | 2/2015 | Hu ...................... H04W 72/542 370/329 |
| 10,411,789 B2 * | 9/2019 | Loehr ................ H04B 7/15542 |
| 2015/0181546 A1 * | 6/2015 | Freda .................... H04W 76/14 370/336 |

* cited by examiner

*Primary Examiner* — Jung Liu
(74) *Attorney, Agent, or Firm* — Holland & Hart LLP

(57) ABSTRACT

Methods, systems, and devices for wireless communications are described. In some systems, a source user equipment (UE) and a relay UE may participate in a decode and forward relaying procedure to provide greater uplink coverage to a base station. As part of the decode and forward relaying procedure, the source UE may transmit source data to the base station and the relay UE may overhear the source data transmission, decode the source data transmission from the source UE, and forward the source data to the base station. In some cases, the base station may unsuccessfully receive the source data from the source UE and the relay UE, and may transmit a groupcast downlink control information (DCI) message to indicate a resource assignment that the source UE and the relay UE may use for retransmitting the source data or for transmitting new source data, or both.

30 Claims, 17 Drawing Sheets

TECHNIQUES FOR DETERMINING RESOURCE ASSIGNMENTS FOR DECODE AND FORWARD RELAYING VIA DOWNLINK CONTROL INFORMATION

CROSS REFERENCE

The present Application for Patent claims the benefit of U.S. Provisional Patent Application No. 63/083,849 by ELSHAFIE et al., entitled "TECHNIQUES FOR DETERMINING RESOURCE ASSIGNMENTS FOR DECODE AND FORWARD RELAYING VIA DOWNLINK CONTROL INFORMATION," filed Sep. 25, 2020, assigned to the assignee hereof, and expressly incorporated by reference herein.

FIELD OF TECHNOLOGY

The following relates to wireless communications, including techniques for determining resource assignments for decode and forward relaying via downlink control information (DCI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for determining resource assignments for decode and forward relaying via downlink control information (DCI). In some wireless communications systems, a base station may configure multiple user equipment (UEs) to support decode and forward relaying, which may provide greater uplink coverage for some UEs within such wireless communication systems. To configure the multiple UEs to support decode and forward relaying, the base station may transmit a first DCI message to the multiple UEs to indicate resources, including any combination of one or more uplink resources or one or more sidelink resources, that the multiple UEs may use for decode and forward relaying.

For example, the first DCI message may indicate an uplink resource, or both an uplink resource and a sidelink resource, over which a source UE (e.g., a first UE) may transmit data and over which the base station and a relay UE (or multiple relay UEs) may monitor for the data transmission from the source UE. In some aspects, the relay UE (e.g., a second UE) may successfully receive and decode the data transmission from the source UE while the base station may unsuccessfully receive and decode the data transmission from the source UE. The first DCI message may also indicate an uplink resource over which the relay UE may forward the data transmission received from the source UE to the base station and, in aspects in which the relay UE successfully receives and decodes the data transmission from the source UE, the relay UE may attempt to forward the data transmission received from the source UE to the base station over the indicated uplink resource. In some cases, however, the base station may fail to receive and decode the data transmission forwarded to the base station by the relay UE.

In some implementations of the present disclosure, the source UE and the relay UE may determine a resource assignment for retransmitting the original data transmission, or for transmitting a new data transmission (e.g., fresh data), or both, for example, based on a second DCI message. The second DCI message may be different than the first DCI message that schedules the resources over which the source UE and the relay UE initially transmit or forward the data transmission. In some examples, the source UE and the relay UE may determine the resource assignment for retransmitting the original data transmission or for transmitting a new data transmission based on the type or the format of the second DCI message. For example, if the second DCI message is of a first type or a first format, the source UE and the relay UE may determine that separate grants are allocated to the source UE and the relay UE for retransmitting the original data transmission or for transmitting a new data transmission.

Alternatively, if the second DCI message is of a second type or a second format, the source UE and the relay UE may determine that a common grant is allocated to the source UE and the relay UE for retransmitting the original data transmission. In some examples, the source UE and the relay UE may determine whether to use their separate grants or the common grant for transmitting the original data transmission or for transmitting a new data transmission based on one or more indications in the second DCI message.

A method for wireless communication at a first UE is described. The method may include receiving, from a base station, a first groupcast DCI message including a first grant for a first set of resources for the first UE for a first data transmission from the first UE and a second grant for a second set of resources for a second UE for a second data transmission from the second UE, receiving, from the base station over a first downlink resource assigned for feedback, a negative acknowledgment (NACK) associated with the first data transmission from the first UE and, from the second UE over a resource assigned for feedback, a positive acknowledgement (ACK) associated with the first data transmission from the first UE, receiving, from the base station, a second groupcast DCI message based on receiving the NACK from the base station and the positive ACK from the second UE, determining a resource assignment for one or more of a retransmission of the first data transmission or a third data transmission based on a type of the second groupcast DCI message, and transmitting, to one or both of the second UE or the base station, the retransmission of the first data transmission or the third data transmission based on the resource assignment.

An apparatus for wireless communication at a first UE is described. The apparatus may include a processor, memory coupled with the processor, and instructions stored in the memory. The instructions may be executable by the processor to cause the apparatus to receive, from a base station, a first groupcast DCI message including a first grant for a first set of resources for the first UE for a first data transmission from the first UE and a second grant for a second set of resources for a second UE for a second data transmission from the second UE, receive, from the base station over a first downlink resource assigned for feedback, a NACK associated with the first data transmission from the first UE and, from the second UE over a resource assigned for feedback, a positive ACK associated with the first data transmission from the first UE, receive, from the base station, a second groupcast DCI message based on receiving the NACK from the base station and the positive ACK from the second UE, determine a resource assignment for one or more of a retransmission of the first data transmission or a third data transmission based on a type of the second groupcast DCI message, and transmit, to one or both of the second UE or the base station, the retransmission of the first data transmission or the third data transmission based on the resource assignment.

Another apparatus for wireless communication at a first UE is described. The apparatus may include means for receiving, from a base station, a first groupcast DCI message including a first grant for a first set of resources for the first UE for a first data transmission from the first UE and a second grant for a second set of resources for a second UE for a second data transmission from the second UE, means for receiving, from the base station over a first downlink resource assigned for feedback, a NACK associated with the first data transmission from the first UE and, from the second UE over a resource assigned for feedback, a positive ACK associated with the first data transmission from the first UE, means for receiving, from the base station, a second groupcast DCI message based on receiving the NACK from the base station and the positive ACK from the second UE, means for determining a resource assignment for one or more of a retransmission of the first data transmission or a third data transmission based on a type of the second groupcast DCI message, and means for transmitting, to one or both of the second UE or the base station, the retransmission of the first data transmission or the third data transmission based on the resource assignment.

A non-transitory computer-readable medium storing code for wireless communication at a first UE is described. The code may include instructions executable by a processor to receive, from a base station, a first groupcast DCI message including a first grant for a first set of resources for the first UE for a first data transmission from the first UE and a second grant for a second set of resources for a second UE for a second data transmission from the second UE, receive, from the base station over a first downlink resource assigned for feedback, a NACK associated with the first data transmission from the first UE and, from the second UE over a resource assigned for feedback, a positive ACK associated with the first data transmission from the first UE, receive, from the base station, a second groupcast DCI message based on receiving the NACK from the base station and the positive ACK from the second UE, determine a resource assignment for one or more of a retransmission of the first data transmission or a third data transmission based on a type of the second groupcast DCI message, and transmit, to one or both of the second UE or the base station, the retransmission of the first data transmission or the third data transmission based on the resource assignment.

In some examples of the method, apparatuses, and non-transitory computer-readable medium described herein, determining the resource assignment may include operations, features, means, or instructions for determining a third grant for a third set of resources for the first UE and a fourth grant for a fourth set of resources for the second UE based on the type of the second groupcast DCI message.

In some examples of the method, apparatuses, and non-transitory computer-readable medium described herein, determining the resource assignment may include operations, features, means, or instructions for determining that the third grant for the third set of resources may be for the third data transmission from the first UE and that the fourth grant for the fourth set of resources may be for a retransmission of the second data transmission from the second UE based on an indication in the second groupcast DCI message; and where transmitting the retransmission of the first data transmission or the third data transmission to the base station includes and transmitting, to one or both of the second UE or the base station over the third set of resources, the third data transmission.

In some examples of the method, apparatuses, and non-transitory computer-readable medium described herein, determining the resource assignment may include operations, features, means, or instructions for determining that the third grant for the third set of resources may be for the retransmission of the first data transmission from the first UE and that the fourth grant for the fourth set of resources may be for a retransmission of the second data transmission from the second UE based on an indication in the second groupcast DCI message; and where transmitting the retransmission of the first data transmission or the third data transmission to the base station includes and transmitting, to one or both of the second UE or the base station over the third set of resources, the retransmission of the first data transmission.

Some examples of the method, apparatuses, and non-transitory computer-readable medium described herein may further include operations, features, means, or instructions for determining that the third grant assigns a second downlink resource for feedback by the base station associated with a transmission from the first UE over the third set of resources based on the type of the second groupcast DCI message and determining that the fourth grant assigns a third downlink resource for feedback by the base station associated with a transmission from the second UE over the fourth set of resources based on the type of the second groupcast DCI message.

In some examples of the method, apparatuses, and non-transitory computer-readable medium described herein, determining the resource assignment may include operations, features, means, or instructions for determining a third grant for a third set of resources for one or both of the first UE or the second UE based on the type of the second groupcast DCI message.

In some examples of the method, apparatuses, and non-transitory computer-readable medium described herein, determining the resource assignment may include operations, features, means, or instructions for determining that the third grant for the third set of resources may be for both the retransmission of the first data transmission from the first UE and a retransmission of the second data transmission from the second UE based on an indication in the second groupcast DCI message; and where transmitting the retransmission of the first data transmission or the third data transmission to the base station includes and transmitting, to one or both of the second UE or the base station over the third set of resources, the retransmission of the first data transmission.

In some examples of the method, apparatuses, and non-transitory computer-readable medium described herein, determining the resource assignment may include operations, features, means, or instructions for determining that the third grant for the third set of resources may be for either the retransmission of the first data transmission from the first UE or a retransmission of the second data transmission from the second UE based on an indication in the second groupcast DCI message.

Some examples of the method, apparatuses, and non-transitory computer-readable medium described herein may further include operations, features, means, or instructions for determining that a first channel quality associated with the first UE may be greater than a second channel quality associated with the second UE based on the indication, where determining the resource assignment may be based on determining that the first channel quality may be greater than the second channel quality.

In some examples of the method, apparatuses, and non-transitory computer-readable medium described herein, determining the resource assignment may include operations, features, means, or instructions for determining that the third grant for the third set of resources may be for the retransmission of the first data transmission from the first UE based on determining that the first channel quality associated with the first UE may be greater than the second channel quality associated with the second UE; and where transmitting the retransmission of the first data transmission or the third data transmission to the base station includes and transmitting, to one or both of the second UE or the base station over the third set of resources, the retransmission of the first data transmission.

Some examples of the method, apparatuses, and non-transitory computer-readable medium described herein may further include operations, features, means, or instructions for determining that the third grant assigns a second downlink resource for feedback by the base station associated with a transmission from one or both of the first UE or the second UE over the third set of resources, where determining the resource assignment may be based on determining that the third grant assigns the second downlink resource for feedback by the base station associated with the transmission from one or both of the first UE or the second UE over the third set of resources.

In some examples of the method, apparatuses, and non-transitory computer-readable medium described herein, transmitting the retransmission of the first data transmission or the third data transmission to one or both of the second UE or the base station may include operations, features, means, or instructions for transmitting the retransmission of the first data transmission or the third data transmission to one or both of the second UE or the base station using a beamforming technique.

In some examples of the method, apparatuses, and non-transitory computer-readable medium described herein, the first data transmission and the second data transmission include identical data originating at the first UE and the third data transmission includes fresh data originating at the first UE.

In some examples of the method, apparatuses, and non-transitory computer-readable medium described herein, the first set of resources includes a sidelink resource and an uplink resource, and where transmitting the retransmission of the first data transmission or the third data transmission includes transmitting the retransmission of the first data transmission or the third data transmission to the second UE using the sidelink resource and to the base station using the uplink resource and the first set of resources exclusively includes the uplink resource, and where transmitting the retransmission of the first data transmission or the third data transmission includes transmitting the retransmission of the first data transmission or the third data transmission to the base station using the uplink resource.

In some examples of the method, apparatuses, and non-transitory computer-readable medium described herein, the type of the second groupcast DCI message includes a DCI format.

In some examples of the method, apparatuses, and non-transitory computer-readable medium described herein, the grant assigns the first uplink resource for the first data transmission from the first UE, assigns the first downlink resource for the feedback by the base station associated with the first data transmission from the first UE, and assigns the resource for the feedback by the second UE associated with the first data transmission from the first UE.

A method for wireless communication at a second UE is described. The method may include receiving, from a base station, a first groupcast DCI message including a first grant for a first set of resources for a first UE for a first data transmission from the first UE and a second grant for a second set of resources for the second UE for a second data transmission from the second UE, transmitting, to the first UE over a resource assigned for feedback, a positive ACK associated with the first data transmission from the first UE, receiving, from the base station over a first downlink resource assigned for feedback, a NACK associated with the second data transmission from the second UE, receiving, from the base station, a second groupcast DCI message based on transmitting the positive ACK to the first UE and receiving the NACK from the base station, determining a resource assignment for a retransmission of the second data transmission based on a type of the second groupcast DCI message, and transmitting, to the base station, the retransmission of the second data transmission based on the resource assignment.

An apparatus for wireless communication at a second UE is described. The apparatus may include a processor, memory coupled with the processor, and instructions stored in the memory. The instructions may be executable by the processor to cause the apparatus to receive, from a base station, a first groupcast DCI message including a first grant for a first set of resources for a first UE for a first data transmission from the first UE and a second grant for a second set of resources for the second UE for a second data transmission from the second UE, transmit, to the first UE over a resource assigned for feedback, a positive ACK associated with the first data transmission from the first UE, receive, from the base station over a first downlink resource assigned for feedback, a NACK associated with the second data transmission from the second UE, receive, from the base station, a second groupcast DCI message based on transmitting the positive ACK to the first UE and receiving the NACK from the base station, determine a resource assignment for a retransmission of the second data transmission based on a type of the second groupcast DCI message, and transmit, to the base station, the retransmission of the second data transmission based on the resource assignment.

Another apparatus for wireless communication at a second UE is described. The apparatus may include means for receiving, from a base station, a first groupcast DCI message including a first grant for a first set of resources for a first UE for a first data transmission from the first UE and a second grant for a second set of resources for the second UE for a second data transmission from the second UE, means for transmitting, to the first UE over a resource assigned for feedback, a positive ACK associated with the first data transmission from the first UE, means for receiving, from the base station over a first downlink resource assigned for feedback, a NACK associated with the second data transmission from the second UE, means for receiving, from the base station, a second groupcast DCI message based on transmitting the positive ACK to the first UE and receiving the NACK from the base station, means for determining a resource assignment for a retransmission of the second data transmission based on a type of the second groupcast DCI message, and means for transmitting, to the base station, the retransmission of the second data transmission based on the resource assignment.

A non-transitory computer-readable medium storing code for wireless communication at a second UE is described. The code may include instructions executable by a processor to receive, from a base station, a first groupcast DCI message including a first grant for a first set of resources for a first UE for a first data transmission from the first UE and a second grant for a second set of resources for the second UE for a second data transmission from the second UE, transmit, to the first UE over a resource assigned for feedback, a positive ACK associated with the first data transmission from the first UE, receive, from the base station over a first downlink resource assigned for feedback, a NACK associated with the second data transmission from the second UE, receive, from the base station, a second groupcast DCI message based on transmitting the positive ACK to the first UE and receiving the NACK from the base station, determine a resource assignment for a retransmission of the second data transmission based on a type of the second groupcast DCI message, and transmit, to the base station, the retransmission of the second data transmission based on the resource assignment.

In some examples of the method, apparatuses, and non-transitory computer-readable medium described herein, determining the resource assignment may include operations, features, means, or instructions for determining a third grant for a third set of resources for the first UE and a fourth grant for a fourth set of resources for the second UE based on the type of the second groupcast DCI message.

In some examples of the method, apparatuses, and non-transitory computer-readable medium described herein, determining the resource assignment may include operations, features, means, or instructions for determining that the third grant for the third set of resources may be for a third data transmission from the first UE and that the fourth grant for the fourth set of resources may be for the retransmission of the second data transmission from the second UE based on an indication in the second groupcast DCI message.

In some examples of the method, apparatuses, and non-transitory computer-readable medium described herein, determining the resource assignment may include operations, features, means, or instructions for determining that the third grant for the third set of resources may be for a retransmission of the first data transmission from the first UE and that the fourth grant for the fourth set of resources may be for the retransmission of the second data transmission from the second UE based on an indication in the second groupcast DCI message.

Some examples of the method, apparatuses, and non-transitory computer-readable medium described herein may further include operations, features, means, or instructions for determining that the third grant assigns a second downlink resource for feedback by the base station associated with a transmission from the first UE over the third set of resources based on the type of the second groupcast DCI message and determining that the fourth grant assigns a third downlink resource for feedback by the base station associated with a transmission from the second UE over the fourth set of resources based on the type of the second groupcast DCI message, where determining the resource assignment may be based on determining that the third grant assigns the second downlink resource for feedback by the base station associated with the transmission from the first UE over the third set of resources and that the fourth grant assigns the third downlink resource for feedback by the base station associated with the transmission from the second UE over the fourth set of resources.

In some examples of the method, apparatuses, and non-transitory computer-readable medium described herein, determining the resource assignment may include operations, features, means, or instructions for determining a third grant for a third set of resources for one or both of the first UE or the second UE based on the type of the second groupcast DCI message.

In some examples of the method, apparatuses, and non-transitory computer-readable medium described herein, determining the resource assignment may include operations, features, means, or instructions for determining that the third grant for the third set of resources may be for both a retransmission of the first data transmission from the first UE and the retransmission of the second data transmission from the second UE based on an indication in the second groupcast DCI message.

In some examples of the method, apparatuses, and non-transitory computer-readable medium described herein, determining the resource assignment may include operations, features, means, or instructions for determining that the third grant for the third set of resources may be for either of a retransmission of the first data transmission from the first UE or the retransmission of the second data transmission from the second UE based on an indication in the second groupcast DCI message.

Some examples of the method, apparatuses, and non-transitory computer-readable medium described herein may further include operations, features, means, or instructions for determining that a first channel quality associated with the first UE may be less than a second channel quality associated with the second UE based on the indication, where determining the resource assignment may be based on determining that the first channel quality associated with the first UE may be less than the second channel quality associated with the second UE.

In some examples of the method, apparatuses, and non-transitory computer-readable medium described herein, determining the resource assignment may include operations, features, means, or instructions for determining that the third grant for the third set of resources may be for the retransmission of the second data transmission from the second UE based on determining that the first channel quality associated with the first UE may be less than the second channel quality associated with the second UE.

Some examples of the method, apparatuses, and non-transitory computer-readable medium described herein may further include operations, features, means, or instructions for determining that the third grant assigns a second downlink resource for feedback by the base station associated with a transmission from one or both of the first UE or the second UE over the third set of resources, where determining the resource assignment may be based on determining that the third grant assigns the second downlink resource for feedback by the base station associated with the transmission from one or both of the first UE or the second UE over the third set of resources.

In some examples of the method, apparatuses, and non-transitory computer-readable medium described herein, transmitting the retransmission of the second data transmission to the base station may include operations, features, means, or instructions for transmitting the retransmission of the second data transmission to the base station using a beamforming technique.

In some examples of the method, apparatuses, and non-transitory computer-readable medium described herein, the first data transmission and the second data transmission include identical data originating at the first UE.

In some examples of the method, apparatuses, and non-transitory computer-readable medium described herein, the type of the second groupcast DCI message includes a DCI format.

In some examples of the method, apparatuses, and non-transitory computer-readable medium described herein, the second grant assigns the second set of resources for the second data transmission from the second UE and assigns the first downlink resource for the feedback by the base station associated with the first data transmission from the second UE.

A method for wireless communication at a base station is described. The method may include transmitting, to a first UE and a second UE, a first groupcast DCI message including a first grant for a first set of resources for the first UE for a first data transmission from the first UE and a second grant for a second set of resources for the second UE for a second data transmission from the second UE, transmitting, to the first UE over a first downlink resource assigned for feedback, a first NACK associated with the first data transmission from the first UE and, to the second UE over a second downlink resource assigned for feedback, a second NACK associated with the second data transmission from the second UE, determining a type of a second groupcast DCI message based on a resource assignment for one or more of a retransmission of the first data transmission from the first UE, a third data transmission from the first UE, or a retransmission of the second data transmission from the second UE, transmitting, to the first UE and the second UE, the second groupcast DCI message, and receiving, from one or both of the first UE or the second UE, the retransmission of the first data transmission, the third data transmission, or the retransmission of the second data transmission based on the type of the second groupcast DCI message.

An apparatus for wireless communication at a base station is described. The apparatus may include a processor, memory coupled with the processor, and instructions stored in the memory. The instructions may be executable by the processor to cause the apparatus to transmit, to a first UE and a second UE, a first groupcast DCI message including a first grant for a first set of resources for the first UE for a first data transmission from the first UE and a second grant for a second set of resources for the second UE for a second data transmission from the second UE, transmit, to the first UE over a first downlink resource assigned for feedback, a first NACK associated with the first data transmission from the first UE and, to the second UE over a second downlink resource assigned for feedback, a second NACK associated with the second data transmission from the second UE, determine a type of a second groupcast DCI message based on a resource assignment for one or more of a retransmission of the first data transmission from the first UE, a third data transmission from the first UE, or a retransmission of the second data transmission from the second UE, transmit, to the first UE and the second UE, the second groupcast DCI message, and receive, from one or both of the first UE or the second UE, the retransmission of the first data transmission, the third data transmission, or the retransmission of the second data transmission based on the type of the second groupcast DCI message.

Another apparatus for wireless communication at a base station is described. The apparatus may include means for transmitting, to a first UE and a second UE, a first groupcast DCI message including a first grant for a first set of resources for the first UE for a first data transmission from the first UE and a second grant for a second set of resources for the second UE for a second data transmission from the second UE, means for transmitting, to the first UE over a first downlink resource assigned for feedback, a first NACK associated with the first data transmission from the first UE and, to the second UE over a second downlink resource assigned for feedback, a second NACK associated with the second data transmission from the second UE, means for determining a type of a second groupcast DCI message based on a resource assignment for one or more of a retransmission of the first data transmission from the first UE, a third data transmission from the first UE, or a retransmission of the second data transmission from the second UE, means for transmitting, to the first UE and the second UE, the second groupcast DCI message, and means for receiving, from one or both of the first UE or the second UE, the retransmission of the first data transmission, the third data transmission, or the retransmission of the second data transmission based on the type of the second groupcast DCI message.

A non-transitory computer-readable medium storing code for wireless communication at a base station is described. The code may include instructions executable by a processor to transmit, to a first UE and a second UE, a first groupcast DCI message including a first grant for a first set of resources for the first UE for a first data transmission from the first UE and a second grant for a second set of resources for the second UE for a second data transmission from the second UE, transmit, to the first UE over a first downlink resource assigned for feedback, a first NACK associated with the first data transmission from the first UE and, to the second UE over a second downlink resource assigned for feedback, a second NACK associated with the second data transmission from the second UE, determine a type of a second groupcast DCI message based on a resource assignment for one or more of a retransmission of the first data transmission from the first UE, a third data transmission from the first UE, or a retransmission of the second data transmission from the second UE, transmit, to the first UE and the second UE, the second groupcast DCI message, and receive, from one or both of the first UE or the second UE, the retransmission of the first data transmission, the third data transmission, or the retransmission of the second data transmission based on the type of the second groupcast DCI message.

Some examples of the method, apparatuses, and non-transitory computer-readable medium described herein may further include operations, features, means, or instructions for determining a third grant for a third set of resources for the first UE and a fourth grant for a fourth set of resources for the second UE, where the resource assignment may be based on the third grant being for the first UE and the fourth grant being for the second UE.

Some examples of the method, apparatuses, and non-transitory computer-readable medium described herein may further include operations, features, means, or instructions for assigning the third grant for the third set of resources for the third data transmission from the first UE and the fourth grant for the fourth set of resources for the retransmission of the second data transmission from the second UE; and where transmitting the second groupcast DCI message includes and transmitting, in the second groupcast DCI message, an indication that the third grant for the third set of resources may be for the third data transmission from the first UE and that the fourth grant for the fourth set of resources may be for the retransmission of the second data transmission from the second UE.

Some examples of the method, apparatuses, and non-transitory computer-readable medium described herein may further include operations, features, means, or instructions for assigning the third grant for the third set of resources for the retransmission of the first data transmission from the first UE and the fourth grant for the fourth set of resources for the retransmission of the second data transmission from the second UE; and where transmitting the second groupcast DCI message includes and transmitting, in the second groupcast DCI message, an indication that the third grant for the third set of resources may be for the retransmission of the first data transmission from the first UE and that the fourth grant for the fourth set of resources may be for the retransmission of the second data transmission from the second UE.

Some examples of the method, apparatuses, and non-transitory computer-readable medium described herein may further include operations, features, means, or instructions for determining a third downlink resource for feedback by the base station associated with a transmission from the first UE over the third set of resources and determining a fourth downlink resource for feedback by the base station associated with a transmission from the second UE over the second set of resources, where the resource assignment may be based on the third downlink resource being for feedback to the first UE and the fourth downlink resource being for feedback to the second UE.

Some examples of the method, apparatuses, and non-transitory computer-readable medium described herein may further include operations, features, means, or instructions for determining a third grant for a third set of resources for one or both of the first UE or the second UE, where the resource assignment may be based on the third grant being for one or both of the first UE or the second UE.

Some examples of the method, apparatuses, and non-transitory computer-readable medium described herein may further include operations, features, means, or instructions for assigning the third grant for the third set of resources for both of the retransmission of the first data transmission from the first UE and the retransmission of the second data transmission from the second UE, where the resource assignment may be based on assigning the third grant for the third set of resources for both of the retransmission of the first data transmission from the first UE and the retransmission of the second data transmission from the second UE.

Some examples of the method, apparatuses, and non-transitory computer-readable medium described herein may further include operations, features, means, or instructions for combining the retransmission of the first data transmission from the first UE and the retransmission of the second data transmission from the second UE, where receiving the retransmission of the first data transmission and the retransmission of the second data transmission may be based on combining the retransmission of the first data transmission from the first UE and the retransmission of the second data transmission from the second UE.

Some examples of the method, apparatuses, and non-transitory computer-readable medium described herein may further include operations, features, means, or instructions for assigning the third grant for the third set of resources for either of the retransmission of the first data transmission from the first UE or the retransmission of the second data transmission from the second UE; and where transmitting the second groupcast DCI message includes and transmitting, in the second groupcast DCI message, an indication that the third grant for the third set of resources may be for either of the retransmission of the first data transmission from the first UE or the retransmission of the second data transmission from the second UE.

Some examples of the method, apparatuses, and non-transitory computer-readable medium described herein may further include operations, features, means, or instructions for determining a first channel quality associated with the first UE and a second channel quality associated with the second UE, determining that the first channel quality may be greater than or less than the second channel quality, and determining the indication based on determining that the first channel quality may be greater than or less than the second channel quality, where the resource assignment may be based on determining the indication.

Some examples of the method, apparatuses, and non-transitory computer-readable medium described herein may further include operations, features, means, or instructions for determining a third downlink resource for feedback by the base station associated with a transmission from one or both of the first UE or the second UE over the third set of resources, where the resource assignment may be based on the third downlink resource being for feedback to one or both of the first UE or the second UE.

In some examples of the method, apparatuses, and non-transitory computer-readable medium described herein, the first data transmission and the second data transmission include identical data originating at the first UE and the third data transmission includes fresh data originating at the first UE.

DETAILED DESCRIPTION

Figure 1:
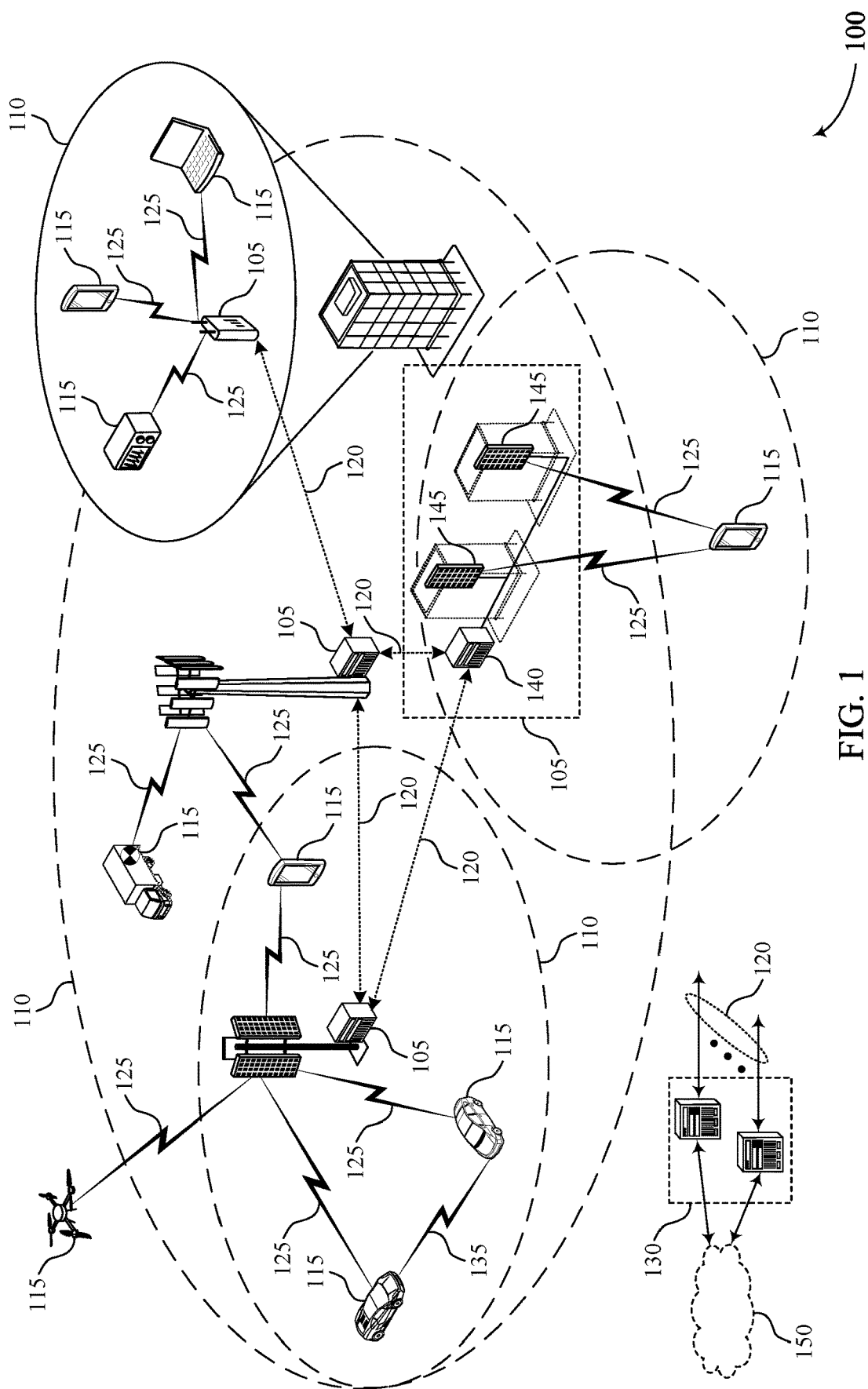
FIGS. 1 and 2 illustrate examples of wireless communications systems that support techniques for determining resource assignments for decode and forward relaying via downlink control information (DCI) in accordance with aspects of the present disclosure.

In some wireless communications systems, a base station may configure multiple user equipment (UEs) to support decode and forward relaying, which may provide for greater uplink coverage for some UEs. For example, a decode and forward relaying procedure may enable a UE (e.g., a relay UE) to listen for an uplink data transmission from a source UE to a base station (or to monitor for a sidelink data transmission including same data as in the uplink data transmission) and, in cases in which the relay UE successfully receives (e.g., "overhears") and decodes the data transmission from the source UE, to forward the data transmission received from the source UE to the base station. This may effectively result in a repeat transmission of the data transmission to the base station, which may increase the likelihood that the base station is able to successfully receive and decode the data. For example, a communication link between the relay UE and the base station may be associated with a greater channel quality than a communication link between the source UE and the base station, such that the base station may have a greater likelihood of successfully receiving a transmission from the relay UE than a transmission from the source UE.

To configure multiple UEs to support decode and forward relaying, the base station may transmit a first downlink control information (DCI) message to the multiple UEs to indicate resources that the multiple UEs may use for a decode and forward relaying procedure. For example, the first DCI message may indicate an uplink resource, a sidelink resource, or both an uplink resource and a sidelink resource over which a source UE may transmit data and over which the base station and a relay UE (or multiple relay UEs) may monitor for the data transmission from the source UE. In some aspects, the relay UE may successfully receive and decode the data transmission from the source UE while the base station may unsuccessfully receive and decode the data transmission from the source UE. The first DCI message may also indicate a resource (e.g., an uplink resource, a sidelink resource, both an uplink resource and a sidelink resource) over which the relay UE may forward the data transmission received from the source UE to the base station and, in aspects in which the relay UE successfully receives and decodes the data transmission from the source UE while the base station fails to successfully receive and decode the data transmission, the relay UE may attempt to forward the data transmission received from the source UE to the base station over the indicated resource. In some cases, however, the base station may fail to receive and decode the data transmission forwarded by the relay UE.

In some implementations of the present disclosure, the source UE and the relay UE may determine a resource assignment for retransmitting the original data transmission or for transmitting a new data transmission (e.g., fresh data), or both, based on a second DCI message. In some examples, the second DCI message may be different than the first DCI message that schedules the resources over which the source UE and the relay UE initially transmit or forward the data transmission. In some examples, the source UE and the relay UE may determine the resource assignment for retransmitting the original data transmission or for transmitting a new data transmission based on the type or the format of the second DCI message. For example, if the second DCI message is of a first type or a first format, the source UE and the relay UE may determine that separate grants are allocated to the source UE and the relay UE for retransmitting the original data transmission or for transmitting a new data transmission. Alternatively, if the second DCI message is of a second type or a second format, the source UE and the relay UE may determine that a common grant (e.g., a single grant) is allocated to both the source UE and the relay UE for retransmitting the original data transmission. In some examples, the source UE and the relay UE may determine whether to use their separate grants or the common grant for transmitting the original data transmission or for transmitting a new data transmission based on one or more indications in the second DCI message.

For instance, in examples in which the source UE and the relay UE determine that the second DCI message is of the first type, the source UE may determine whether to retransmit the original data transmission or to transmit new data over the source UE's grant based on an indication or information in the second DCI message. Similarly, in such examples in which the source UE and the relay UE determine that the second DCI message is of the first type, the relay UE may determine whether to retransmit the original data transmission previously forwarded by the relay UE over the relay UE's grant based on an indication or information in the second DCI message. Alternatively, in examples in which the source UE and the relay UE determine that the second DCI message is of the second type, the second DCI message may indicate that both the source UE and the relay retransmit the original data transmission over the common grant or may indicate that one of the source UE or the relay UE retransmit the original data transmission over the common grant.

Particular implementations of the subject matter described in this disclosure can be implemented to realize one or more of the following potential advantages. In some implementations, the described techniques can provide for greater uplink coverage for UEs within a decode and forward relaying procedure by providing, via DCI, resource assignments over which the source UE and the relay UE may retransmit an original data transmission. Such greater uplink coverage may result in a greater likelihood that the base station will be able to successfully receive the original data transmission from the source UE. Further, some implementations may provide resources for a retransmission of the original data transmission to the base station from the relay UE while also providing resources for a new data transmission (e.g., fresh data) to the base station from the source UE, which may support greater uplink coverage while also increasing the achievable system throughput as the source UE can begin transmitting new data to the base station, for example, before the successful reception by the base station of the original data (e.g., the source UE can transmit fresh data while the relay UE handles the original data). As such, the described techniques may provide for greater and more seamless uplink coverage, higher throughput, greater system capacity, and lower latency, among other benefits.

Aspects of the disclosure are initially described in the context of wireless communications systems. Aspects of the disclosure are additionally described in the context of communication timelines and a process flow. Aspects of the disclosure are further illustrated by and described with reference to apparatus diagrams, system diagrams, and flowcharts that relate to techniques for determining resource assignments for decode and forward relaying via DCI.

FIG. 1 illustrates an example of a wireless communications system 100 that supports techniques for determining resource assignments for decode and forward relaying via DCI in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, a base station 105 may transmit DCI (including one or more DCI messages) to multiple UEs 115 to configure a decode and forward relaying procedure with uplink tunneling between the multiple UEs 115 to provide greater uplink coverage for the multiple UEs 115. To configure the multiple UEs 115 to support the decode and forward relaying procedure, the base station 105 may transmit a first DCI message to the multiple UEs 115 to indicate resources that the multiple UEs 115 may use for the decode and forward relaying procedure. For example, the first DCI message may indicate an uplink resource over which a source UE 115 may transmit data and the base station 105 and a relay UE 115 (or multiple relay UEs 115) may monitor the uplink resource for the data transmission from the source UE 115. In some aspects, the relay UE 115 may successfully receive and decode the data transmission from the source UE 115 while the base station 105 may unsuccessfully receive and decode the data transmission from the source UE 115. The first DCI message may indicate an uplink resource over which the relay UE 115 may forward the data transmission received from the source UE 115 to the base station 105 and, in aspects in which the relay UE 115 successfully receives and decodes the data transmission from the source UE 115 while the base station 105 fails to successfully receive and decode the data transmission, the relay UE 115 may attempt to forward the data transmission received from the source UE 115 to the base station 105 over the indicated uplink resource. In some cases, however, the base station 105 may fail to receive and decode the data transmission forwarded by the relay UE 115.

In some implementations of the present disclosure, the source UE 115 and the relay UE 115 may determine a resource assignment for retransmitting the original data transmission, or for transmitting a new data transmission (e.g., fresh data), or both, based on a second DCI message. The second DCI message may, in some examples, be the same as the first DCI message that schedules the uplink resources over which the source UE 115 and the relay UE 115 initially transmit or forward the data transmission or may be different than the first DCI message that schedules the uplink resources over which the source UE 115 and the relay UE 115 initially transmit or forward the data transmission. In some examples, the source UE 115 and the relay UE 115 may determine the resource assignment for retransmitting the original data transmission or for transmitting a new data transmission based on the type or the format of the second DCI message. For example, if the second DCI message is of a first type or a first format, the source UE 115 and the relay UE 115 may determine that separate uplink grants are allocated to the source UE 115 and the relay UE 115 for retransmitting the original data transmission or for transmitting a new data transmission. Alternatively, if the second DCI message is of a second type or a second format, the source UE 115 and the relay UE 115 may determine that a same uplink grant is allocated to both the source UE 115 and the relay UE 115 for retransmitting the original data transmission. In some examples, the source UE 115 and the relay UE 115 may determine whether to use their separate uplink grants or the common uplink grant for transmitting the original data transmission or for transmitting a new data transmission based on one or more indications in the second DCI message.

Figure 2:
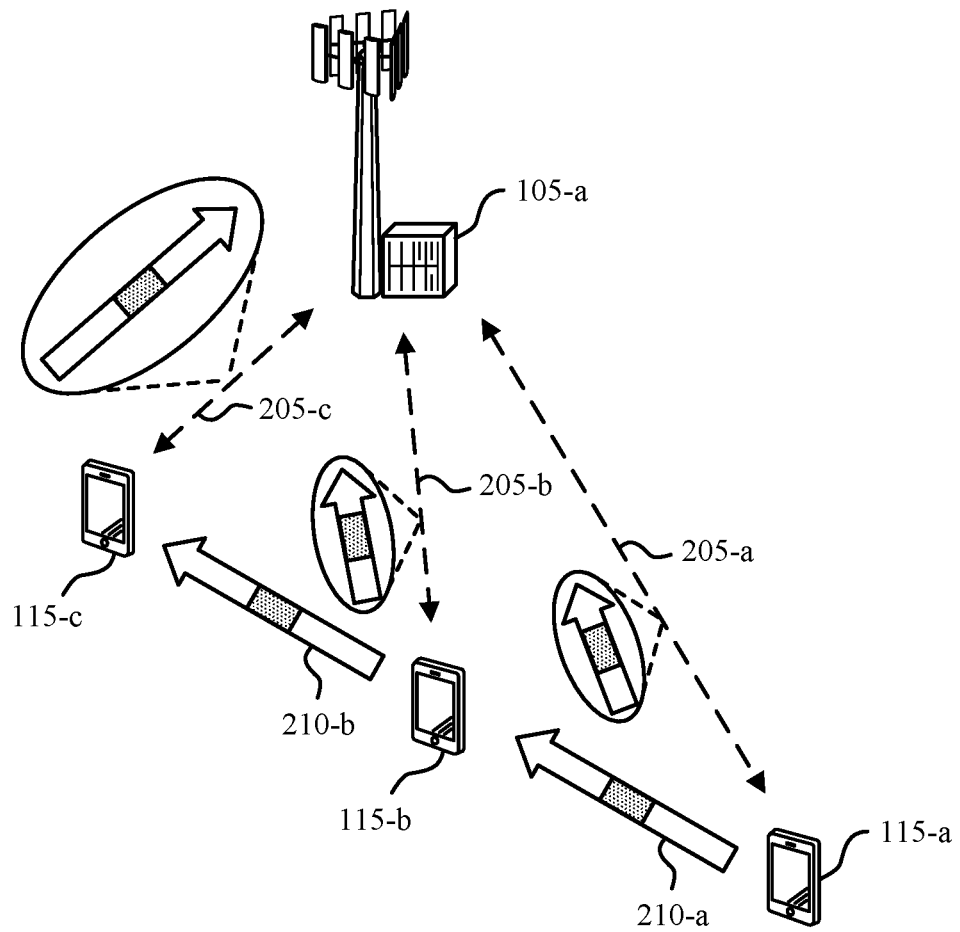

FIG. 2 illustrates an example of a wireless communications system 200 that supports techniques for determining resource assignments for decode and forward relaying via DCI in accordance with aspects of the present disclosure. In some examples, the wireless communications system 200 may implement aspects of the wireless communications system 100. The wireless communications system 200 may include a base station 105-a that may communicate with multiple UEs 115 within a geographic coverage region associated with the base station 105-a. The base station 105-a may transmit one or more DCI messages to the multiple UEs 115 to support a decode and forward relaying procedure between the multiple UEs 115 and, in some examples, one or more of the UEs 115 may determine a resource assignment for retransmitting data that was previously unsuccessfully forwarded to the base station 105-a or for transmitting fresh data to the base station 105-a, or both, based on the one or more DCI messages.

In some cases, the base station 105-a may broadcast or groupcast DCI to establish one or more uplink tunnels (e.g., a multi-hop tunnel) from a source UE 115, such as a UE 115-a, to the base station 105-a via one or more relay UEs, such as one or both of a UE 115-b or a UE 115-c. Such uplink tunneling from the UE 115-a to the base station 105-a via the UE 115-b or the UE 115-c, or both, may include the allocation of dedicated time and frequency resources over which the UE 115-a may send a data transmission 215 to the base station 105-a and the allocation of dedicated time and frequency resources over which the UE 115-b or the UE 115-c may forward the data transmission 215 to the base station 105-a. For instance, the base station 105-a may transmit DCI to the UE 115-a, the UE 115-b, and the UE 115-c, and the DCI may indicate a first uplink resource over which the UE 115-a may transmit a data transmission 215 to the base station 105-a over a communication link 205-a. In some examples, the base station 105-a and the UE 115-b or the UE 115-c, or both, may listen or monitor over the first uplink resource for the data transmission 215. As shown in the wireless communications system 200, the UE 115-b may listen or monitor for transmissions (e.g., uplink transmissions) from the UE 115-a over a communication link 210-a. As such, the UE 115-b may monitor for the data transmission 215 from the UE 115-a to the base station 105-a and, if the UE 115-b receives (e.g., "overhears") the data transmission 215 from the UE 115-a, the UE 115-b may attempt to decode the data transmission 215 as part of the decode and forward relaying procedure.

The DCI may also indicate a downlink resource over which the base station 105-a may transmit feedback to the UE 115-a associated with the data transmission 215 from the UE 115-a and a resource (e.g., a downlink resource or a sidelink resource) over which the UE 115-b may transmit feedback to the UE 115-a associated with the data transmission 215 from the UE 115-a. As such, the base station 105-a may transmit an acknowledgment (ACK), which may also be referred to as a positive ACK, or a negative acknowledgment (NACK) to the UE 115-a over the indicated downlink resource based on whether the base station 105-a successfully or unsuccessfully receives and decodes the data transmission 215 from the UE 115-a. Similarly, the UE 115-b may transmit an ACK or a NACK, or an indication of whether the UE 115-b participates in the decode and forward relaying procedure (which may be based on a capability of the UE 115-b), to the UE 115-a over the indicated resource based on whether the UE 115-b successfully or unsuccessfully receives and decodes the data transmission 215 from the UE 115-a.

In some cases, the base station 105-a may unsuccessfully receive and decode the data transmission 215 from the UE 115-a over the communication link 205-a and the UE 115-b may successfully receive and decode the data transmission 215 from the UE 115-a over the communication link 210-a. In such cases, the base station 105-a may transmit a NACK to the UE 115-a over the downlink resource indicated by the DCI and the UE 115-b may transmit an ACK to the UE 115-a over the resource indicated by the DCI. Accordingly, the UE 115-a may determine that the data transmission 215 was successfully received by the UE 115-*b* and unsuccessfully received by the base station 105-*a*.

The DCI may also indicate an uplink resource over which the UE 115-*b* may forward the data transmission 215 to the base station 105-*a* over the communication link 205-*b* and a downlink resource over which the base station 105-*a* may provide feedback to the UE 115-*b* based on whether or not the base station 105-*a* successfully receives and decodes the data transmission 215 forwarded by the UE 115-*b*. In some cases, the base station 105-*a* may fail to successfully receive and decode the data transmission 215 forwarded by the UE 115-*b* (e.g., in addition to failing to successfully receive and decode the data transmission 215 from the UE 115-*a*) and, in such cases, the base station 105-*a* may transmit a NACK to the UE 115-*b* over the downlink resource assigned for feedback to the data transmission 215 forwarded by the UE 115-*b*.

In some cases, the DCI scheduling the initial data transmission 215 from the UE 115-*a* and the initial forwarding of the data transmission 215 from the UE 115-*b* may indicate the uplink resources over which the UE 115-*a* may send the data transmission 215 and over which the UE 115-*b* may forward the data transmission 215, the resource over which the UE 115-*b* may transmit feedback to the UE 115-*a*, and the downlink resources over which the base station 105-*a* may transmit feedback to the UE 115-*a* and the UE 115-*a* based on indicating a quantity of time domain resources (such as slots or symbols). For example, the DCI may indicate a quantity of slots or a quantity of symbols starting from the resource over which the base station 105-*a* transmits the DCI to the beginning of such uplink resources, resource, and downlink resources. In other words, the base station 105-*a* may assign two grants to the data transmission 215 (e.g., a source UE data packet), including a first grant for the data transmission 215 from the UE 115-*a* to the base station 105-*a* and a second grant for the forwarding of the data transmission 215 from the UE 115-*b* to the base station 105-*a*. In some examples, each grant is associated with the uplink resource for transmitting or forwarding the data transmission 215 and one or more resources for feedback responsive to the transmitting or forwarding.

Further, although described in the context of two UEs 115 (e.g., the UE 115-*a* and the UE 115-*b*), such DCI may also indicate a grant for any number of UEs 115 for transmitting or forwarding the data transmission 215 to the base station 105-*a*. For example, the UE 115-*c* may attempt to receive and decode the data transmission 215 forwarded by the UE 115-*b* over the second grant over a communication link 210-*b* and the DCI may include a third grant associated with a third uplink resource over which the UE 115-*c* may forward the data transmission 215 to the base station 105-*a* over the communication link 205-*c*. Likewise, the DCI may also indicate a downlink resource over which the base station 105-*a* may transmit feedback associated with the data transmission 215 forwarded by the UE 115-*c*. As such, the UE 115-*a*, the UE 115-*b*, and the UE 115-*c* may participate in the decode and relay procedure to increase the likelihood of the base station 105-*a* to successfully receive and decode the data transmission 215.

For example, the base station 105-*a* may have a greater likelihood of successfully receiving and decoding the data transmission 215 based on receiving multiple instances of the data transmission 215 from multiple UEs 115. Further, the communication links 205 between the base station 105-*a* and the multiple UEs 115 may be associated with different link or channel qualities, and the likelihood that at least one of the communication links 205 is sufficiently high (e.g., sufficiently high to enable successful reception by the base station 105-*a*) increases in kind with an increase in the quantity of the multiple transmission instances of the data transmission 215. For example, the UE 115-*b* may be able to receive (e.g., "overhear") the data transmission 215 from the UE 115-*a* because the UE 115-*b* is approximately between the UE 115-*a* and the base station 105-*a* (e.g., the UE 115-*b* may be closer to the base station 105-*a* than the UE 115-*a*) and, as such, the communication link 205-*b* may be associated with a greater channel quality than the communication link 205-*c*. Similarly, the UE 115-*c* may be able to receive (e.g., "overhear") the data transmission 215 forwarded by the UE 115-*b* (or transmitted from the UE 115-*a*) because the UE 115-*c* is approximately between the UE 115-*b* and the base station 105-*a* (e.g., the UE 115-*c* may be closer to the base station 105-*a* than the UE 115-*b* and the UE 115-*a*) and, as such, the communication link 205-*c* may be associated with a greater channel quality than the communication link 205-*b* and the communication link 205-*a*. Accordingly, in some examples, the base station 105-*a* may have a greater likelihood of receiving the data transmission 215 forwarded by the UE 115-*b* or the UE 115-*c* than the data transmission 215 from the UE 115-*a*.

In some cases, however, the base station 105-*a* may unsuccessfully receive and decode (e.g., based on attempting to receive the data, decode the data or both) the data transmission 215 from any of the UE 115-*a*, the UE 115-*b*, and the UE 115-*c*. Accordingly, the base station 105-*a* may transmit a NACK to each of the transmitting or forwarding (e.g., relaying) UEs 115. In such cases, the UEs 115 may be unaware of the status of the data transmission 215 (e.g., whether or not the data transmission 215 was successfully received by the base station 105-*a*) and may inefficiently use resources for retransmitting the data transmission 215 or may increase the latency associated with the reception of the data transmission 215 based on refraining from retransmitting the data transmission 215 (e.g., based on transmitting other, or fresher, data than the data included in the data transmission 215) without coordination between the UEs 115.

In some implementations of the present disclosure, the base station 105-*a* may transmit additional DCI to coordinate resource usage between the UEs 115 for either retransmitting the data transmission 215 or for transmitting new data in a second data transmission. For example, the base station 105-*a* may transmit DCI indicating one or more grants (e.g., uplink grants or sidelink grants or both) associated with resources (e.g., uplink resources, sidelink resources, both uplink resources and sidelink resources) over which the UEs 115 may provide a retransmission of the data transmission 215 (e.g., a first or original data transmission) or a new data transmission (e.g., a second or fresh data transmission).

In some examples, the additional DCI may include separate grants for each of the number of UEs 115 that may participate in the decode and forward relaying procedure. For example, the DCI may include one or more of a first grant associated with a first uplink resource (e.g., and, in some examples, a first sidelink resource) for the UE 115-*a*, a second grant associated with a second uplink resource (e.g., and, in some examples, a second sidelink resource) for the UE 115-*b*, or a third grant associated with a third uplink resource (e.g., and, in some examples, a third sidelink resource) for the UE 115-*c*. In examples in which the DCI includes three separate grants for the UE 115-*a*, the UE 115-*b*, and the UE 115-*c*, the UE 115-*a*, the UE 115-*b*, and the UE 115-*c* may transmit a retransmission of the data transmission 215 (e.g., a retransmission of the first or original data transmission) or a new data transmission (e.g., the second or fresh data transmission) over their respective uplink resources, or sidelink resources, or both.

In some other examples, the additional DCI may include a common grant for the number of UEs 115 that may participate in the decode and forward relaying procedure. For example, the DCI may include a single grant associated with an uplink resource (e.g., and, in some examples, a sidelink resource) for one or more of the UE 115-*a*, the UE 115-*b*, or the UE 115-*c* to use for transmitting the retransmission of the data transmission 215 (e.g., a retransmission of the first or original data transmission) or the new data transmission (e.g., the second or fresh data transmission). In some aspects, the base station 105-*a* may configure or otherwise determine a type or a format of the additional DCI based on whether the DCI includes separate grants or a common grant and the UEs 115 may determine whether separate grants are to be used or a common grant is to be used based on determining the type or the format of the DCI.

In examples in which the base station 105-*a* transmits DCI including separate grants for each of the UEs 115 that may participate in the decode and forward relaying procedure, each assigned uplink resource or sidelink resource may be associated with a corresponding downlink resource over which the base station 105-*a* may transmit feedback responsive to the transmission over the uplink resource or the sidelink resource. For example, the DCI may indicate a first uplink resource, or a first sidelink resource, or both, for the UE 115-*a* and a second uplink resource, or a second sidelink resource, or both, for the UE 115-*b* and each of the first uplink resource or first sidelink resource and the second uplink resource or second sidelink resource may be associated with a corresponding downlink resource over which the base station 105-*a* may transmit feedback responsive to the transmission from the UE 115-*a* and the UE 115-*b*, respectively. In other words, the separate grants indicated by the base station 105-*a* via the DCI may each be associated with a separate resource for feedback (e.g., HARQ-ACK feedback) from the base station 105-*a*.

In some implementations, the base station 105-*a* may indicate, via the DCI and for each UE 115 of the UEs 115 that may participate in the decode and forward relay procedure, whether to retransmit the data transmission 215 (e.g., the first or original transmission) or the new data transmission (e.g., the second or fresh data transmission) over their respectively assigned uplink or sidelink resources. For example, the DCI may include an indication for the UE 115-*a* to transmit fresh data over the first uplink or sidelink resource assigned to the UE 115-*a* and may include an indication for the UE 115-*b* to retransmit the data transmission 215 over the second uplink and/or sidelink resource assigned to the UE 115-*b*. Alternatively, the DCI may include an indication for the UE 115-*a* to retransmit the data transmission 215 over the first uplink and/or sidelink resource assigned to the UE 115-*a* and may include an indication for the UE 115-*b* to retransmit the data transmission 215 over the second uplink and/or sidelink resource assigned to the UE 115-*b*. As such, the base station 105-*a* may coordinate or balance the retransmission of the data transmission 215 with the transmission of fresh data from one or more of the UE 115-*a*, the UE 115-*b*, or the UE 115-*c* using the DCI. Additional details relating to such coordination between the UEs 115 relating to which UEs 115 may retransmit the data transmission 215 and which UEs 115 may transmit fresh data over separate grants are described herein, including with reference to FIGS. 3 and 4.

In examples in which the base station 105-*a* transmits DCI including a common grant for the UEs 115 that may participate in the decode and forward relaying procedure, the common grant may be associated with a corresponding downlink resource over which the base station 105-*a* may provide feedback responsive to the transmission (or transmissions) over the uplink and/or sidelink resource associated with the common grant. For example, the DCI may indicate a first grant associated with a first uplink resource, or a first sidelink resource, or both, for one or more of the UE 115-*a*, the UE 115-*b*, and the UE 115-*c* and the first uplink resource, or the first sidelink resource, or both, may be associated with a corresponding downlink resource over which the base station 105-*a* may transmit feedback to one or more of the UE 115-*a*, the UE 115-*b*, and the UE 115-*c*. In other words, the common grant (e.g., a single grant) indicated by the base station 105-*a* via the DCI may be associated with a single resource for feedback (e.g., HARQ-ACK feedback).

In some implementations, the base station 105-*a* may indicate, via the DCI and for each UE 115 of the UEs 115 that may participate in the decode and forward relay procedure, whether to retransmit the data transmission 215 (e.g., the first or original transmission) over the first uplink resource or the first sidelink resource, or both, associated with the common grant. For example, the DCI may include an indication for both of the UE 115-*a* and the UE 115-*b* to retransmit the data transmission 215 over the first uplink resource or the first sidelink resource, or both (e.g., for the UE 115-*a* and the UE 115-*b* to retransmit the data transmission 215 simultaneously). Similarly, the DCI may include an indication for any two or more of the UE 115-*a*, the UE 115-*b*, or the UE 115-*c* to retransmit the data transmission 215 over the first uplink resource, or the first sidelink resource, or both, associated with the common grant. Alternatively, the DCI may include an indication for one of (e.g., not two or more of) the UE 115-*a*, the UE 115-*b*, or the UE 115-*c* to retransmit the data transmission 215 over the first uplink resource, or the first sidelink resource, or both. In such examples in which the DCI indicates one of the UE 115-*a*, the UE 115-*b*, or the UE 115-*c* to retransmit the data transmission 215 over the first uplink resource, or the first sidelink resource, or both, the base station 105-*a* may determine from which of the UE 115-*a*, the UE 115-*b*, or the UE 115-*c* the retransmission of the data transmission 215 may be transmitted based on which of the UE 115-*a*, the UE 115-*b*, and the UE 115-*c* has a communication link 205 associated with a greatest channel quality. As such, the base station 105-*a* may coordinate the retransmission of the data transmission 215 from one or more of the UE 115-*a*, the UE 115-*b*, or the UE 115-*c* using the DCI. Additional details relating to such coordination between the UEs 115 relating to which UEs 115 may retransmit the data transmission 215 over a common grant are described herein, including with reference to FIG. 5.

Figure 3:
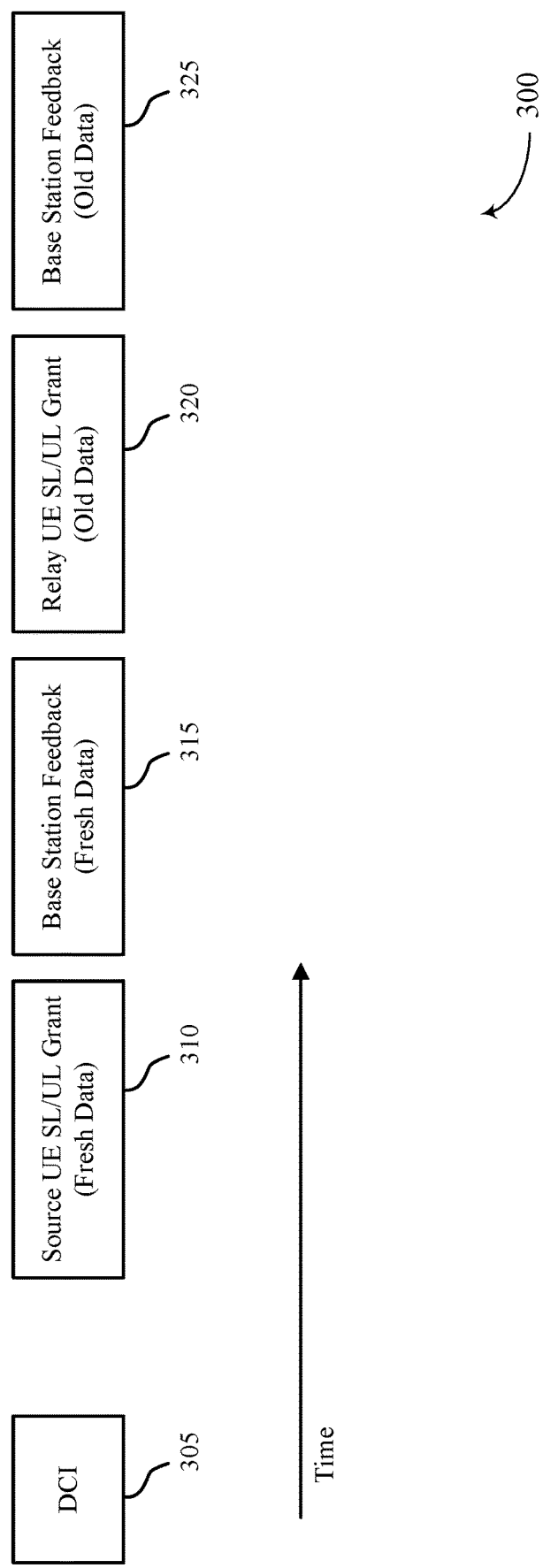
FIG. 3 illustrates an example of a communication timeline that supports techniques for determining resource assignments for decode and forward relaying via DCI in accordance with aspects of the present disclosure.

FIG. 3 illustrates an example of a communication timeline 300 that supports techniques for determining resource assignments for decode and forward relaying via DCI in accordance with aspects of the present disclosure. In some examples, the communication timeline 300 may be implemented by or implemented to realize aspects of the wireless communications system 100 or the wireless communications system 200. For example, a base station 105, a source UE 115, and a relay UE 115, which may be examples of corresponding devices described herein, may communicate according to the communication timeline 300 to support coordination and balancing between the retransmission of old data (e.g., a first or original data transmission) and the transmission of fresh data (e.g., a second or new data transmission) within a decode and forward relaying procedure. The communication timeline 300 illustrates an example in which the base station 105 transmits DCI including an indication of separate grants for each of the source UE 115 and the relay UE 115 and including information configuring the source UE 115 to transmit fresh data while the relay UE 115 retransmits old data.

For example, the relay UE 115 may have successfully received and decoded a data transmission including the old data (e.g., an old data packet) from the source UE 115 and attempted to forward the data transmission including the old data to the base station 105, and the base station 105 may have unsuccessfully received the data transmission from both the source UE 115 and the relay UE 115. As such, the old data included in the original data transmission may be known to both the source UE 115 (at which the old data may have originated) and the relay UE 115 (which may store the old data based on successful decoding). Accordingly, in some of the implementations described in the present disclosure, the base station 105 may transmit the DCI including the indication of the separate grants for the source UE 115 and the relay UE 115 to coordinate the retransmission of the old data and balance the retransmission of the old data with the transmission of the fresh data. In some implementations, the source UE 115 and the relay UE 115 may determine that the DCI indicates separate grants based on a type or a format of the DCI (e.g., different types of DCI may represent different formats with different content or information). For example, the source UE 115 and the relay UE 115 may determine that the DCI is of a first type or of a first format and, as such, may determine that the DCI includes separate grants for the source UE 115 and the relay UE 115.

In some examples, the base station 105 may transmit the DCI over a downlink resource 305 and the DCI may indicate the location (e.g., the time or frequency location) of a resource 310 and a resource 320, as well as a downlink resource 315 and a downlink resource 325 for feedback associated with transmissions over each of the resource 310 and the resource 320, respectively. In some aspects, the indication of the location of the various uplink and downlink resources illustrated in the communication timeline 300 may include a quantity of time-domain resources, such as one or more of slots or symbols, associated with the beginning time of each of the allocated resources relative to the ending time of the downlink resource 305 carrying the DCI.

As shown in the communication timeline 300, the DCI may include an indication that the resource 310 is for the source UE 115 and is assigned for the transmission of fresh data from the source UE 115 and that the resource 320 is for the relay UE 115 and is assigned for the retransmission of the old data from the relay UE 115. Accordingly, the source UE 115 may transmit the fresh data to the base station 105 over the resource 310 and may expect to receive feedback from the base station 105 associated with the fresh data transmission over the downlink resource 315. Additionally, the relay UE 115 may retransmit the old data to the base station 105 over the resource 320 and may expect to receive feedback from the base station 105 associated with the retransmission of the old data over the downlink resource 325. In some examples, the resource 310 may include one or both of an uplink resource (e.g., sent over a Uu link) or a sidelink resource. In such examples, the source UE 115 may transmit the fresh data to one or both of the relay UE 115 or the base station 105 based on which or both of the uplink resource or the sidelink resource are included in the resource 310. In some examples, the resource 320 may include one or both of an uplink resource or a sidelink resource. In such examples, the relay UE 115 may transmit the old data to one or both of another relay UE 115 or the base station 105 based on which or both of the uplink resource or the sidelink resource are included in the resource 320.

In such implementations in which the source UE 115 is configured to transmit fresh data while the relay UE 115 handles the retransmission of the old data, the source UE 115 and the relay UE 115 may achieve greater resource efficiency while also potentially reducing latency associated with the fresh data (e.g., new or fresh data packets queued at the source UE 115), as the source UE 115 may transmit such fresh data to the base station 105 before the successful reception of the old data by the base station 105. In some aspects, such use of separate grants to enable the source UE 115 to transmit fresh data and the relay UE 115 to retransmit the old data may be associated with a first mode of the first type of DCI.

Figure 4:
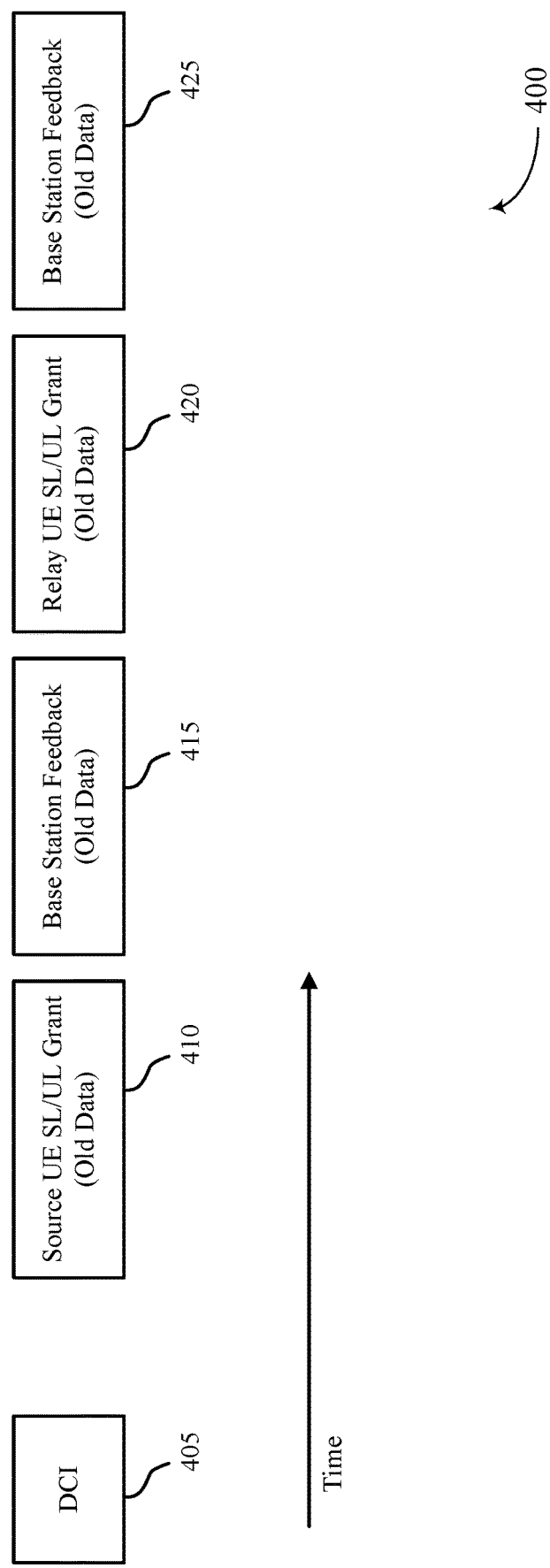
FIG. 4 illustrates an example of a communication timeline that supports techniques for determining resource assignments for decode and forward relaying via DCI in accordance with aspects of the present disclosure.

FIG. 4 illustrates an example of a communication timeline 400 that supports techniques for determining resource assignments for decode and forward relaying via DCI in accordance with aspects of the present disclosure. In some examples, the communication timeline 400 may be implemented by or implemented to realize aspects of the wireless communications system 100 or the wireless communications system 200. For example, a base station 105, a source UE 115, and a relay UE 115, which may be examples of corresponding devices described herein, may communicate according to the communication timeline 400 to support coordination between the retransmission of old data (e.g., a first or original data transmission) within a decode and forward relaying procedure. The communication timeline 400 illustrates an example in which the base station 105 transmits DCI including an indication of separate grants for each of the source UE 115 and the relay UE 115 and including information configuring both of the source UE 115 and the relay UE 115 to retransmit old data over their different uplink resources.

For example, the relay UE 115 may have successfully received and decoded a data transmission including the old data (e.g., an old data packet) from the source UE 115 and attempted to forward the data transmission including the old data to the base station 105, and the base station 105 may have unsuccessfully received the data transmission from both the source UE 115 and the relay UE 115. As such, the old data included in the original data transmission may be known to both the source UE 115 (at which the old data may have originated) and the relay UE 115 (which may store the old data based on successful decoding). Accordingly, in some of the implementations described in the present disclosure, the base station 105 may transmit the DCI including the indication of the separate grants for the source UE 115 and the relay UE 115 to coordinate the retransmission of the old data. In some implementations, the source UE 115 and the relay UE 115 may determine that the DCI indicates separate grants based on a type or a format of the DCI (e.g., different types of DCI may represent different formats with different content or information). For example, the source UE 115 and the relay UE 115 may determine that the DCI is of a first type or of a first format and, as such, may determine that the DCI includes separate grants for the source UE 115 and the relay UE 115.

In some examples, the base station 105 may transmit the DCI over a downlink resource 405 and the DCI may indicate the location (e.g., the time or frequency location) of a resource 410 and a resource 420, as well as a downlink resource 415 and a downlink resource 425 for feedback associated with transmissions over each of the resource 410 and the resource 420, respectively. In some aspects, the indication of the location of the various uplink and downlink resources illustrated in the communication timeline 400 may include a quantity of time-domain resources, such as one or more of slots or symbols, associated with the beginning time of each of the allocated resources relative to the ending time of the downlink resource 405 carrying the DCI.

As shown in the communication timeline 400, the DCI may include an indication that the resource 410 is for the source UE 115 and is assigned for the retransmission of the old data from the source UE 115 and that the resource 420 is for the relay UE 115 and is also assigned for the retransmission of the old data from the relay UE 115. Accordingly, the source UE 115 may retransmit the old data to the base station 105 over the resource 410 and may expect to receive feedback from the base station 105 associated with the old data transmission over the downlink resource 415. Additionally, the relay UE 115 may retransmit the old data to the base station 105 over the resource 420 and may expect to receive feedback from the base station 15 associated with the retransmission of the old data over the downlink resource 425. In some examples, the resource 410 may include one or both of an uplink resource or a sidelink resource. In such examples, the source UE 115 may transmit the old data to one or both of the relay UE 115 or the base station 105 based on which or both of the uplink resource or the sidelink resource are included in the resource 410. In some examples, the resource 420 may include one or both of an uplink resource or a sidelink resource. In such examples, the relay UE 115 may transmit the old data to one or both of another relay UE 115 or the base station 105 based on which or both of the uplink resource or the sidelink resource are included in the resource 420.

In such implementations in which the source UE 115 and the relay UE 115 are both configured to provide retransmissions of the old data to the base station 105, the base station 105 may have a greater likelihood of receiving the old data (based on a greater number of transmission instances), which may result in lower latency associated with the successful reception of the old data by the base station 105. As such, both the source UE 115 and the relay UE 115 may continue to retransmit the old data (e.g., the same data packet) until the base station 105 successfully decodes the old data. In some aspects, such use of separate grants to enable both the source UE 115 and the relay UE 115 to retransmit the old data may be associated with a second mode of the first type of DCI. For example, the first type of DCI may be associated with two modes, including the first mode as described with reference to FIG. 3 and the second mode as described here with reference to FIG. 4.

Figure 5:
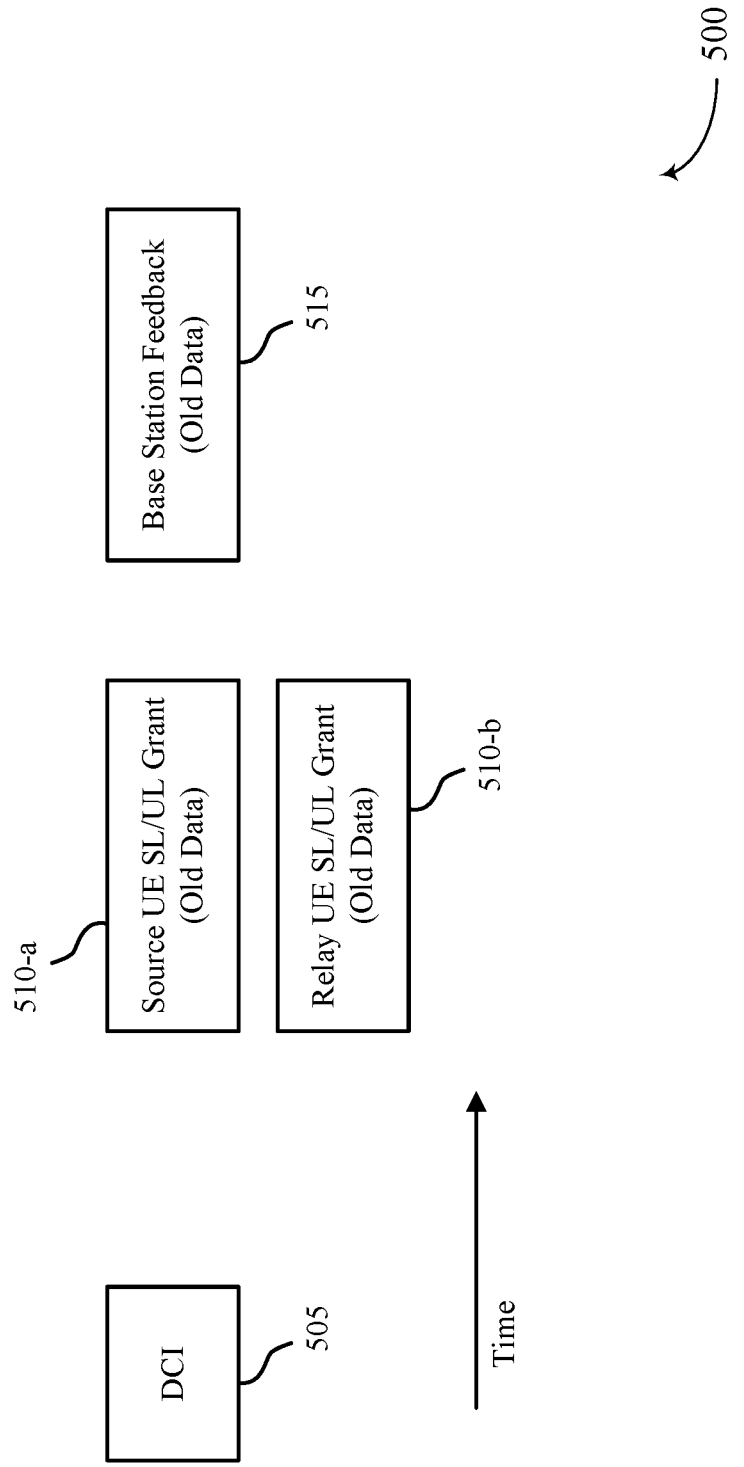
FIG. 5 illustrates an example of a communication timeline that supports techniques for determining resource assignments for decode and forward relaying via DCI in accordance with aspects of the present disclosure.

FIG. 5 illustrates an example of a communication timeline 500 that supports techniques for determining resource assignments for decode and forward relaying via DCI in accordance with aspects of the present disclosure. In some examples, the communication timeline 500 may be implemented by or implemented to realize aspects of the wireless communications system 100 or the wireless communications system 200. For example, a base station 105, a source UE 115, and a relay UE 115, which may be examples of corresponding devices described herein, may communicate according to the communication timeline 500 to support coordination between the retransmission of old data (e.g., a first or original data transmission) within a decode and forward relaying procedure. The communication timeline 500 illustrates an example in which the base station 105 transmits DCI including an indication of a common grant for both of the source UE 115 and the relay UE 115 and including information configuring either or both of the source UE 115 and the relay UE 115 to retransmit old data over a common resource 510.

For example, the relay UE 115 may have successfully received and decoded a data transmission including the old data (e.g., an old data packet) from the source UE 115 and attempted to forward the data transmission including the old data to the base station 105, and the base station 105 may have unsuccessfully received the data transmission from both the source UE 115 and the relay UE 115. As such, the old data included in the original data transmission may be known to both the source UE 115 (at which the old data may have originated) and the relay UE 115 (which may store the old data based on successful decoding). Accordingly, in some of the implementations described in the present disclosure, the base station 105 may transmit the DCI including the indication of the common grant for either or both of the source UE 115 and the relay UE 115 to use for the retransmission of the old data. In some implementations, the source UE 115 and the relay UE 115 may determine that the DCI indicates the common grant for the retransmission of the old data based on the type or the format of the DCI (e.g., different types of DCI may represent different formats with different content or information). For example, the source UE 115 and the relay UE 115 may determine that the DCI is of a second type or of a second format and, as such, may determine that the DCI includes a common grant for the source UE 115 and the relay UE 115.

In some examples, the base station 105 may transmit the DCI over a downlink resource 505 and the DCI may indicate the location (e.g., the time or frequency location) of the resource 510 and a downlink resource 515 for feedback associated with transmissions over the resource 510. In some aspects, the indication of the location of the various uplink, sidelink, and downlink resources illustrated in the communication timeline 500 may include a quantity of time-domain resources, such as one or more of slots or symbols, associated with the beginning time of each of the allocated resources relative to the ending time of the downlink resource 505 carrying the DCI. In some cases, the DCI may further indicate a mode associated with the common grant such that the mode may indicate whether one or both of the source UE 115 and the relay UE 115 are to retransmit the old data over the resource 510. For example, the DCI may indicate that the source UE 115 and the relay UE 115 operate in a first mode in which both the source UE 115 and the relay UE 115 retransmit the old data over the resource 510, a second mode in which the relay UE 115 may retransmit the old data over the resource 510 while the source UE 115 refrains from transmitting (i.e., remains silent), or a third mode in which the source UE 115 may retransmit the old data over the resource 510 while the relay UE 115 refrains from transmitting (i.e., remains silent).

In the first mode, for example, the DCI may include an indication that a resource 510-*a* is for the source UE 115 and is assigned for the retransmission of the old data from the source UE 115 and that a resource 510-*b* is for the relay UE 115 and is also assigned for the retransmission of the old data from the relay UE 115. The resource 510-*a* and the resource 510-*b* may be associated with the same uplink or sidelink grant and, in some examples, may include different frequency resources over the same time resources. In some other examples, the resource 510-*a* and the resource 510-*b* may include at least partially overlapping frequency resources. In both examples, the resource 510-*a* and the resource 510-*b* may be portions of an inclusive resource 510 associated with the common uplink or sidelink grant. In such implementations in which the DCI assigns the resource 510-*a* for the retransmission of the old data from the source UE 115 and assigns the resource 510-*b* for the retransmission of the old data from the relay UE 115, the source UE 115 and the relay UE 115 may retransmit the old data to the base station 105 simultaneously. In some examples, the source UE 115 and the relay UE 115 may beamform the retransmissions of the old data to the base station 105 and the base station 105 may receive a combined transmission of the old data at a receiver of the base station 105, which may increase the likelihood of the base station 105 to successfully decode the old data. Such a joint retransmission of the old data by both the source UE 115 and the relay UE 115 may Additionally or alternatively, in the second mode or the third mode, the DCI may include an indication that the resource 510-*a* is for the source UE 115 and is assigned for the retransmission of the old data from the source UE 115 or that the resource 510-*b* is for the relay UE 115 and is assigned for the retransmission of the old data from the relay UE 115, but not both. In other words, the DCI may indicate that one of the source UE 115 or the relay 115 retransmits the old data, but not both. In the second mode, for example, the DCI may indicate that the relay UE 115 retransmits the old data over the resource 510-*b* and that the source UE 115 refrains from retransmitting the old data over the resource 510-*a*. Alternatively, in the third mode, the DCI may indicate that the source UE 115 retransmits the old data over the resource 510-*a* and that the relay UE 115 refrains from retransmitting the old data over the resource 510-*b*.

In some implementations, the base station 105 may select one of the source UE 115 or the relay UE 115 (e.g., the base station 105 may select the second mode or the third mode) based on which of the source UE 115 and the relay UE 115 have a communication link to the base station 105 associated with a greater channel quality. For example, the base station 105 may configure the source UE 115 or the relay UE 115 to retransmit the old data over the resource 510 based on a recent channel measurement, such as a CSI measurement, from both the communication link between the source UE 115 and the base station 105 and the communication link between the relay UE 115 and the base station 105. Accordingly, in examples in which the base station 105 determines that the communication link between the relay UE 115 and the base station 105 is associated with a greater channel quality than the communication link between the source UE 115 and the base station 105, the base station 105 may indicate that the relay UE 115 retransmits the old data over the resource 510-*b* and that the source UE 115 refrains from retransmitting the old data over the resource 510-*a*. Alternatively, in examples in which the base station 105 determines that the communication link between the source UE 115 and the base station 105 is associated with a greater channel quality than the communication link between the relay UE 115 and the base station 105, the base station 105 may indicate that the source UE 115 retransmits the old data over the resource 510-*a* and that the relay UE 115 refrains from retransmitting the old data over the resource 510-*b*. As described herein, one or both of the resource 510-*a* or the resource 510-*b* may be or include one or more uplink resources or one or more sidelink resources, or any combination thereof.

Figure 6:
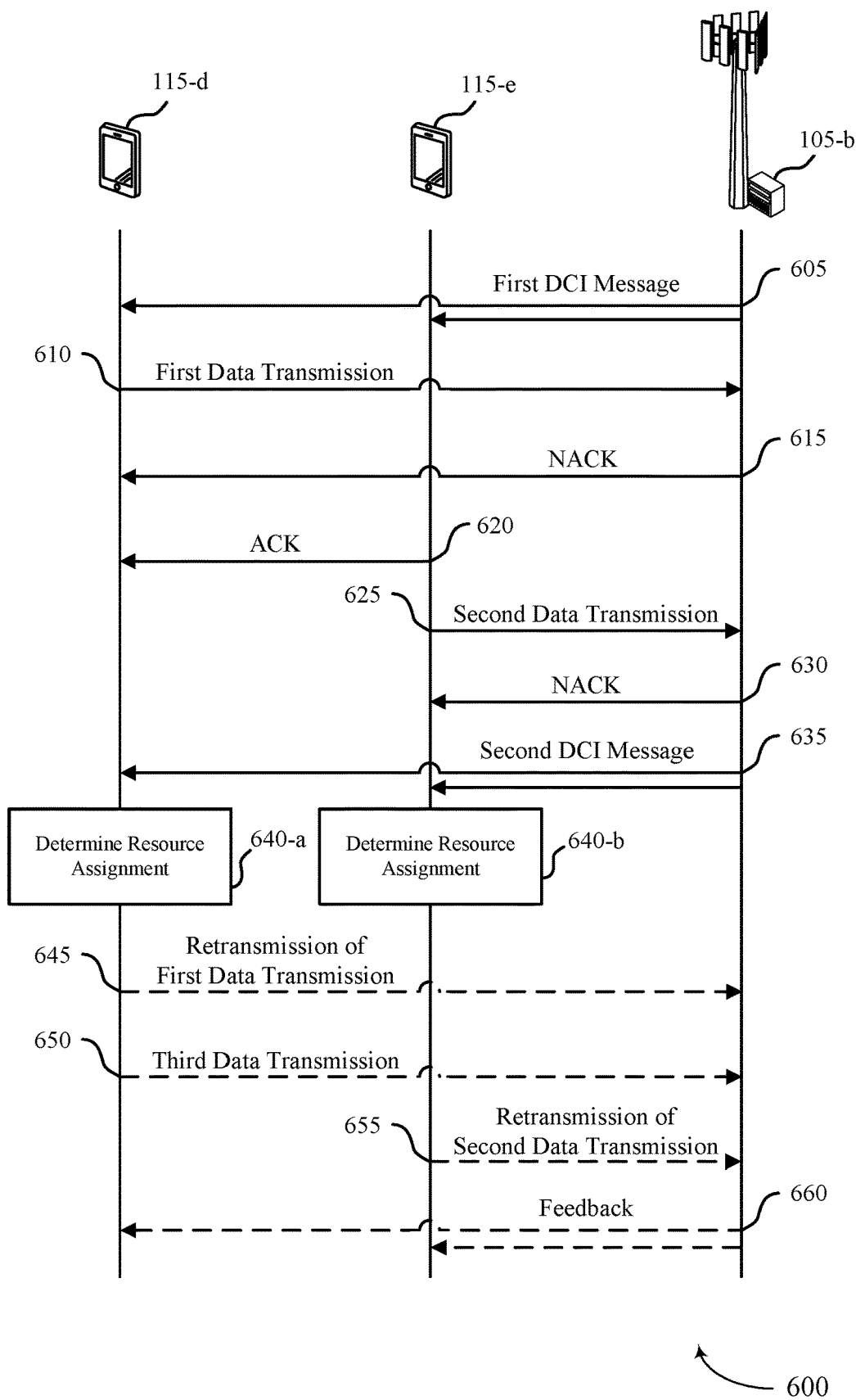
FIG. 6 illustrates an example of a process flow that supports techniques for determining resource assignments for decode and forward relaying via DCI in accordance with aspects of the present disclosure.

FIG. 6 illustrates an example of a process flow 600 that supports techniques for determining resource assignments for decode and forward relaying via DCI in accordance with aspects of the present disclosure. In some examples, the process flow 600 may implement aspects of the wireless communications system 100 or the wireless communications system 200. The process flow 600 may illustrate communications between a base station 105-*b*, a UE 115-*d*, and a UE 115-*e*, which may be examples of corresponding devices described herein. For example, the UE 115-*d* may function as a source UE or a first UE and the UE 115-*e* may function as a relay UE or a second UE within a decode and forward relaying procedure for forwarding source data from the UE 115-*d* to the base station 105-*b*. In some examples, the base station 105-*b* may provide DCI (e.g., one or more DCI messages) to coordinate resource usage between the UE 115-*d* and the UE 115-*e* to support greater resource efficiency or to reduce latency associated with data transmissions from the UE 115-*d*, or both.

At 605, the base station 105-*b* may transmit a first DCI message to the UE 115-*d* and the UE 115-*e*. The base station 105-*b* may transmit the first DCI message via broadcast or groupcast signaling. Alternatively, instead of transmitting a single first DCI message, the base station 105-*b* may transmit DCI messages to each of the UE 115-*d* and the UE 115-*e* separately. The base station 105-*b* may transmit the first DCI message (or the multiple DCI messages) to setup or otherwise establish dedicated time and frequency resources over which the UE 115-*d* and the UE 115-*e* may transmit or forward data as part of the decode and forward relaying procedure. In some examples, for instance, the first DCI message may include a first grant for a first set of resources over which the UE 115-*d* may transmit a first data transmission including source data and a second grant for a second set of resources over which the UE 115-*e* may transmit a second data transmission. In some examples, the second data transmission from the UE 115-*e* may include the same source data as the first data transmission from the UE 115-*d* and, as such, may be equivalently referred to as or function as a relaying or forwarding of the first data transmission from the UE 115-*e*.

The first grant may assign (e.g., include or otherwise be associated with) a first downlink resource over which the base station 105-*b* may transmit feedback (e.g., HARQ-ACK) associated with or responsive to the first data transmission from the UE 115-*d* and a resource over which the UE 115-*e* may transmit feedback (an ACK or a NACK, or an indication of whether the UE 115-*e* participates in the decode and forward relaying procedure) associated with or responsive to the first data transmission from the UE 115-*d*. Similarly, the second grant may assign (e.g., include or otherwise be associated with) a second downlink resource over which the base station 105-*b* may transmit feedback associated with or responsive to the second data transmission from the UE 115-*e*.

At 610, the UE 115-*d* may transmit the first data transmission to the base station 105-*b* over the first set of resources. Accordingly, and based on the first grant, at 615, the base station 105-*b* may transmit feedback to the UE 115-*d* over the first downlink resource. In some examples, the base station 105-*b* may unsuccessfully receive and decode the first data transmission from the UE 115-*d* and may transmit a NACK to the UE 115-*d* based on unsuccessfully receiving and decoding the first data transmission. Additionally, at 620, the UE 115-*e* may transmit feedback to the UE 115-*d* over the resource. In some examples, the UE 115-*e* may successfully receive (e.g., "overhear") and decode the first data transmission from the UE 115-*d* and may transmit an ACK to the UE 115-*d* based on successfully receiving and decoding the first data transmission. The UE 115-*e* may either receive the first data transmission from the UE 115-*d* over a sidelink resource or "overhear" the first data transmission over an uplink resource. Further, in some cases, the UE 115-*e* may transmit an "unable to participate" to the UE 115-*d* if the UE 115-*e* is unable to decode and forward the first data transmission to the base station 105-*b*.

At 625, the UE 115-*e* may transmit the second data transmission to the base station 105-*b* over the second set of resources (e.g., an uplink resource) based on successfully receiving and decoding the first data transmission from the UE 115-*d* (e.g., based on transmitting the ACK to the UE 115-*d*). As described herein, the second data transmission from the UE 115-*e* may include the same data as the first data transmission from the UE 115-*d* (e.g., the UE 115-*e* may function as a relay between the UE 115-*d* and the base station 105-*b*). Accordingly, and based on the second grant, at 630, the base station 105-*b* may transmit feedback to the UE 115-*e* over the second downlink resource. In some examples, the base station 105-*b* may unsuccessfully receive and decode the second data transmission from the UE 115-*e* and may transmit a NACK to the UE 115-*e* based on unsuccessfully receiving and decoding the second data transmission.

At 635, the base station 105-*b* may transmit a second DCI message to the UE 115-*d* and the UE 115-*e*. The base station 105-*b* may transmit the second DCI message via broadcast or groupcast signaling. Alternatively, instead of transmitting a single second DCI message, the base station 105-*b* may transmit DCI messages to each of the UE 115-*d* and the UE 115-*e* separately. In some aspects, the first DCI message and the second DCI message may be separate and different DCI messages and, as such, the base station 105-*b* may transmit the first DCI message and the second DCI message over different resources (e.g., at different times). In such examples in which the first DCI message and the second DCI message are different DCI messages, the base station 105-*b* may transmit the second DCI message based on transmitting a NACK to each of the UE 115-*d* and the UE 115-*e* responsive to transmissions from the UE 115-*d* and the UE 115-*e*, respectively, over resources that were allocated for the decode and forward relaying procedure. In other words, the base station 105-*b* may transmit the second DCI message to the UE 115-*d* and the UE 115-*e* based on determining that the base station 105-*b* was unable to successfully decode the source data originating at the UE 115-*d* transmitted to the base station 105-*b* via both the first data transmission from the UE 115-*d* and the second data transmission from the UE 115-*e*.

In some implementations, the second DCI message may include one or more grants that the UE 115-*d* may use for either a retransmission of the first data transmission or a third data transmission (e.g., a transmission of fresh source data originating at the UE 115-*d*) or that the UE 115-*e* may use for a retransmission of the second data transmission, or a combination thereof. In some examples, the base station 105-*b* may configure the type of the second DCI message (e.g., which may represent a format associated with content or information corresponding to the type) to indicate, to the UE 115-*d* and the UE 115-*e*, whether the second DCI message includes a separate grant for each of the UE 115-*d* and the UE 115-*e* or a common grant for one or both of the UE 115-*d* or the UE 115-*e*.

For example, the base station 105-*b* may configure the second DCI message as a first type of DCI message and, as such, the second DCI message may include a third grant for a third set of resources over which the UE 115-*d* may transmit either a retransmission of the first data transmission or a third data transmission and may include a fourth grant for a fourth set of resources over which the UE 115-*e* may transmit a retransmission of the second data transmission. In such examples, the second DCI message may include one or more indications or information relating to the separate grants for the UE 115-*d* and the UE 115-*e*. Alternatively, the base station 105-*b* may configure the second DCI message as a second type of DCI message and, as such, the second DCI message may include a third grant (e.g., a common grant) associated with a third set of resources over which either or both of the UE 115-*d* or the UE 115-*e* may retransmit the original (or old) source data. For instance, in examples in which the DCI includes the common grant associated with a common uplink resource or a common sidelink resource, or both, the UE 115-*d* may use the common resource or the common sidelink resource for retransmitting the first data transmission or the UE 115-*e* may use the common uplink resource or the common sidelink resource for retransmitting the second data transmission, or both. In examples in which the UE 115-*d* uses the common resource for retransmitting the first data transmission and the UE 115-*e* uses the common resource for retransmitting the second data transmission, the UE 115-*d* and the UE 115-*e* may perform simultaneous transmissions of identical data (because the first data transmission and the second data transmission may include identical data). In such examples, the second DCI message may include one or more indications or information relating to the common grant for the UE 115-*d* and the UE 115-*e*.

At 640-*a*, the UE 115-*d* may determine a resource assignment for the retransmission of the first data transmission (e.g., a retransmission of the old data) or the third data transmission (e.g., a transmission of fresh data) based on the type of the second DCI message and the information included in the second DCI message. For example, the UE 115-*d* may determine whether to retransmit the first data transmission, to transmit the third data transmission, or to remain silent and whether separate grants are to be used or a common grant is to be used based on the second DCI message. Similarly, at 640-*b*, the UE 115-*d* may determine a resource assignment for the retransmission of the second data transmission based on the type of the second DCI message and the information included in the second DCI message. For example, the UE 115-*e* may determine whether to retransmit the second data transmission or to remain silent and whether separate grants are to be used or a common grant is to be used based on the second DCI message.

At 645, the UE 115-*d* may, in some implementations, transmit a third data transmission to the base station 105-*b* based on an indication in the second DCI message. In some examples, the UE 115-*d* may transmit the third data transmission over a resource that is separately configured for the UE 115-*d*. In examples in which the UE 115-*d* transmits the third data transmission to the base station 105-*b* over a separately configured resource, the UE 115-*e* may transmit a retransmission of the second data transmission over a different resource. In some aspects, the UE 115-*d* may transmit the third data transmission to the base station 105-*b* using a beamforming technique. Additional details relating to the third data transmission (e.g., a fresh data transmission) are described herein, including with reference to FIG. 3.

At 650, the UE 115-*d* may, in some implementations, transmit a retransmission of the first data transmission to the base station 105-*b* based on an indication in the second DCI message. In some examples, the UE 115-*d* may transmit the retransmission of the first data transmission over an uplink resource or a sidelink resource that is separately configured for the UE 115-*d* or that is commonly configured for both the UE 115-d and the UE 115-e. In examples in which the UE 115-d transmits the retransmission of the first data transmission to the base station 105-b over a separately configured resource, the UE 115-e may transmit a retransmission of the second data transmission over a different resource (e.g., a different uplink resource). In examples in which the UE 115-d transmits the retransmission of the first data transmission to the base station 105-b over a commonly configured resource (e.g., a commonly configured uplink resource), the UE 115-d may transmit the retransmission of the first data transmission alone (e.g., the UE 115-e may remain silent) or at the same time that the UE 115-e transmits the retransmission of the second data transmission. In examples in which the UE 115-d transmits the retransmission of the first data transmission over the commonly configured resource alone, the UE 115-d may determine to transmit the retransmission of the first data transmission based on an indication in the second DCI message indicating that the communication link between the UE 115-d and the base station 105-b is associated with a greater channel quality than the communication link between the UE 115-e and the base station 105-b. In some aspects, the UE 115-d may transmit the retransmission of the first data transmission to the base station 105-b using a beamforming technique. Additional details relating to the retransmission of the first data transmission (e.g., an old data transmission) are described herein, including with reference to FIGS. 4 and 5.

At 655, the UE 115-e may, in some implementations, transmit a retransmission of the second data transmission to the base station 105-b based on an indication in the second DCI message. In some examples, the UE 115-e may transmit the retransmission of the second data transmission over a separately configured resource or a commonly configured resource. In examples in which the UE 115-e transmits the retransmission of the second data transmission over the separately configured resource, the UE 115-d may transmit either the retransmission of the first data transmission or the third data transmission over a different resource. In examples in which the UE 115-e transmits the retransmission of the second data transmission over a commonly configured resource, the UE 115-e may transmit the retransmission of the second data transmission alone (e.g., the UE 115-d may remain silent) or at the same time that the UE 115-d transmits the retransmission of the first data transmission. In examples in which the UE 115-e transmits the retransmission of the second data transmission over the commonly configured resource alone, the UE 115-e may determine to transmit the retransmission of the second data transmission based on an indication in the second DCI message indicating that the communication link between the UE 115-e and the base station 105-b is associated with a greater channel quality than the communication link between the UE 115-d and the base station 105-b. In some aspects, the UE 115-e may transmit the retransmission of the second data transmission to the base station 105-b using a beamforming technique. Additional details relating to the retransmission of the second data transmission (e.g., an old data transmission) are described herein, including with reference to FIGS. 3 through 5.

At 660, the base station 105-b may transmit feedback to the UE 115-d or the UE 115-e, or both. In some examples, the base station 105-b may transmit feedback to the UE 115-d responsive to one of the retransmission of the first data transmission or the third data transmission and may transmit feedback to the UE 115-e responsive to the retransmission of the second data transmission. In some aspects, the base station 105-b may transmit the feedback to the UE 115-d and the UE 115-e over downlink resources assigned or otherwise associated with the uplink resources over which the UE 115-d may transmit retransmission of the first data transmission or the third data transmission and the resources over which the UE 115-e may transmit the retransmission of the second data transmission. For example, the downlink resources over which the base station 105-b may transmit feedback may be indicated within the second DCI message including the one or more grants for one or more of the retransmission of the first data transmission, the third data transmission, or the retransmission of the second data transmission. Additional details relating to the transmission of feedback and the downlink resources over which the base station 105-b may provide such feedback are described herein, including with reference to FIGS. 3 through 5.

Figure 7:
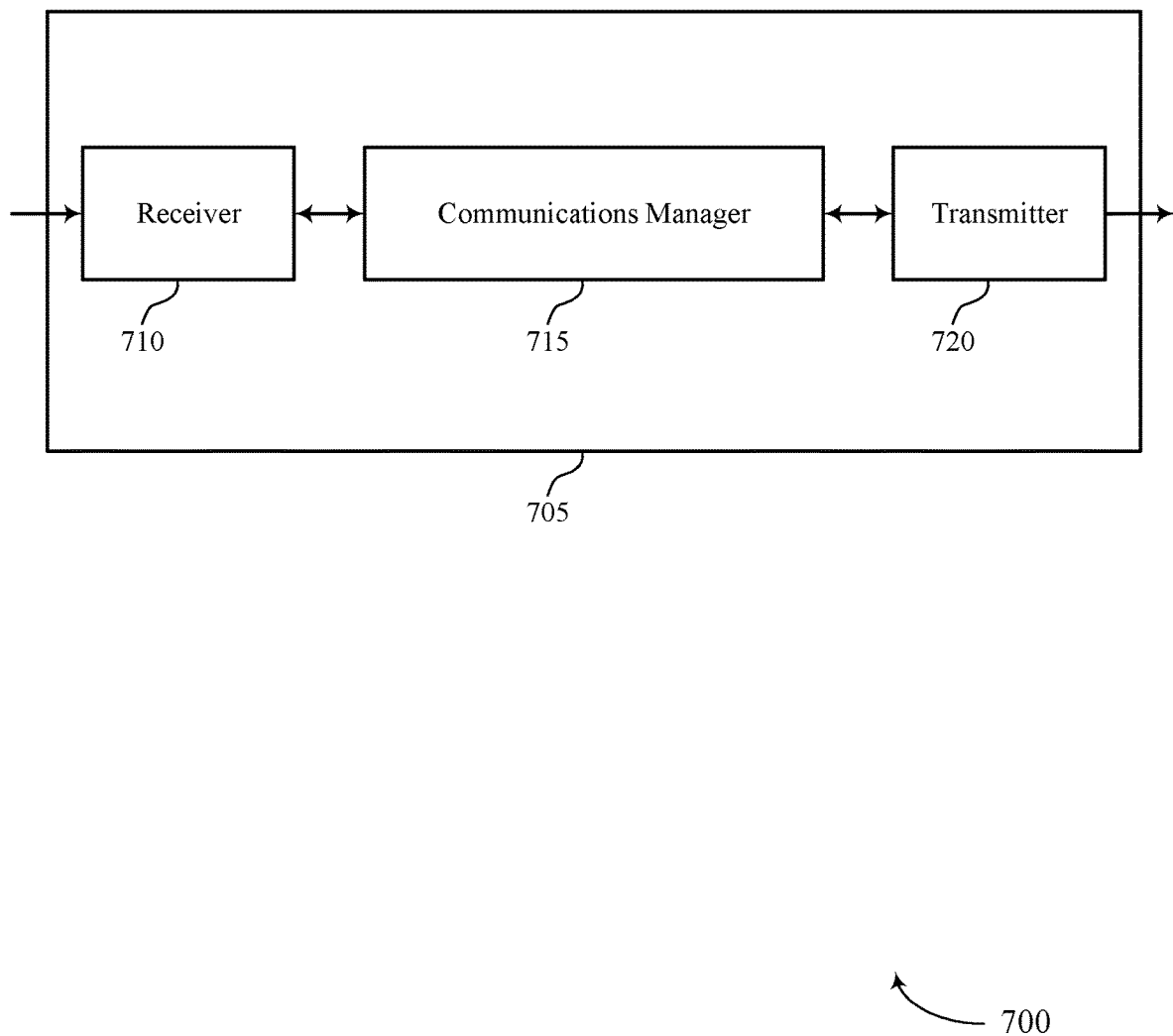
FIGS. 7 and 8 show block diagrams of devices that support techniques for determining resource assignments for decode and forward relaying via DCI in accordance with aspects of the present disclosure.

FIG. 7 shows a block diagram 700 of a device 705 that supports techniques for determining resource assignments for decode and forward relaying via DCI in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to techniques for determining resource assignments for decode and forward relaying via DCI, etc.). Information may be passed on to other components of the device 705. The receiver 710 may be an example of aspects of the transceiver 1020 described with reference to FIG. 10. The receiver 710 may utilize a single antenna or a set of antennas.

In some examples, the communications manager 715 may function as or operate within a first UE. In such examples, the communications manager 715 may receive, from a base station, a first groupcast DCI message including a first grant for the first UE associated with a first uplink resource for a first data transmission from the first UE and a second grant for a second UE associated with a second uplink resource for a second data transmission from the second UE. In some examples, the communications manager 715 may receive, from the base station, a second groupcast DCI message based on receiving the negative acknowledgment from the base station and the positive ACK from the second UE. In some examples, the communications manager 715 may receive, from the base station over a first downlink resource assigned for feedback, a NACK associated with the first data transmission from the first UE and, from the second UE over a resource assigned for feedback, a positive ACK associated with the first data transmission from the first UE. In some examples, the communications manager 715 may determine a resource assignment for one or more of a retransmission of the first data transmission or a third data transmission based on a type of the second groupcast DCI message. In some examples, the communications manager 715 may transmit, to the base station, the retransmission of the first data transmission or the third data transmission based on the resource assignment.

In some other examples, the communications manager may function as or operate within a second UE. In such examples, the communications manager 715 may receive, from a base station, a first groupcast DCI message including a first grant for a first UE associated with a first uplink resource for a first data transmission from the first UE and a second grant for the second UE associated with a second uplink resource for a second data transmission from the second UE. In some examples, the communications manager 715 may receive, from the base station, a second groupcast DCI message based on transmitting the positive ACK to the first UE and receiving the negative acknowledgment from the base station. In some examples, the communications manager 715 may transmit, to the first UE over a resource assigned for feedback, a positive ACK associated with the first data transmission from the first UE. In some examples, the communications manager 715 may receive, from the base station over a first downlink resource assigned for feedback, a NACK associated with the second data transmission from the second UE. In some examples, the communications manager 715 may determine a resource assignment for a retransmission of the second data transmission based on a type of the second groupcast DCI message. In some examples, the communications manager 715 may transmit, to the base station, the retransmission of the second data transmission based on the resource assignment. The communications manager 715 may be an example of aspects of the communications manager 1010 described herein.

Additionally or alternatively, the communications manager 715 may function as or operate within a first UE. In such examples, the communications manager 715 may be configured as or otherwise support a means for receiving, from a base station, a first groupcast DCI message including a first grant for a first set of resources for the first UE for a first data transmission from the first UE and a second grant for a second set of resources for a second UE for a second data transmission from the second UE. The communications manager 715 may be configured as or otherwise support a means for receiving, from the base station over a first downlink resource assigned for feedback, a NACK associated with the first data transmission from the first UE and, from the second UE over a resource assigned for feedback, a positive ACK associated with the first data transmission from the first UE. The communications manager 715 may be configured as or otherwise support a means for receiving, from the base station, a second groupcast DCI message based on receiving the NACK from the base station and the positive ACK from the second UE. The communications manager 715 may be configured as or otherwise support a means for determining a resource assignment for one or more of a retransmission of the first data transmission or a third data transmission based on a type of the second groupcast DCI message. The communications manager 715 may be configured as or otherwise support a means for transmitting, to one or both of the second UE or the base station, the retransmission of the first data transmission or the third data transmission based on the resource assignment.

In some other examples, the communications manager may function as or operate within a second UE. In such examples, the communications manager 715 may be configured as or otherwise support a means for receiving, from a base station, a first groupcast DCI message including a first grant for a first set of resources for a first UE for a first data transmission from the first UE and a second grant for a second set of resources for the second UE for a second data transmission from the second UE. The communications manager 715 may be configured as or otherwise support a means for transmitting, to the first UE over a resource assigned for feedback, a positive ACK associated with the first data transmission from the first UE. The communications manager 715 may be configured as or otherwise support a means for receiving, from the base station over a first downlink resource assigned for feedback, a NACK associated with the second data transmission from the second UE. The communications manager 715 may be configured as or otherwise support a means for receiving, from the base station, a second groupcast DCI message based on transmitting the positive ACK to the first UE and receiving the NACK from the base station. The communications manager 715 may be configured as or otherwise support a means for determining a resource assignment for a retransmission of the second data transmission based on a type of the second groupcast DCI message. The communications manager 715 may be configured as or otherwise support a means for transmitting, to the base station, the retransmission of the second data transmission based on the resource assignment.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 715 may be implemented as an integrated circuit or chipset for a mobile device modem, and the receiver 710 and the transmitter 720 may be implemented as analog components (for example, amplifiers, filters, antennas) coupled to the mobile device modem to enable wireless transmission and reception over one or more bands.

The communications manager 715 may be implemented to realize one or more potential advantages. In some implementations, the communications manager 715 may determine whether to retransmit old data or to transmit new data within a decode and forward relaying procedure based on receiving DCI including one or more grants and including information relating to whether the communications manager 715 is scheduled for retransmitting the old data or transmitting the new data. As such, the communications manager 715 may achieve greater resource efficiency as well as increasing reliability while maintaining low latency associated with data transmissions to a base station. Such added efficiency and reliability may result in a greater likelihood of the base station being able to successfully decode data transmissions from the device 705, which may in turn result in fewer retransmissions for the communications manager 715. As such, the communications manager 715, or one or more processing units of the communications manager 715, may enter a sleep mode more frequently or for longer durations, which may improve power savings and increase battery life at the device 705.

Figure 8:
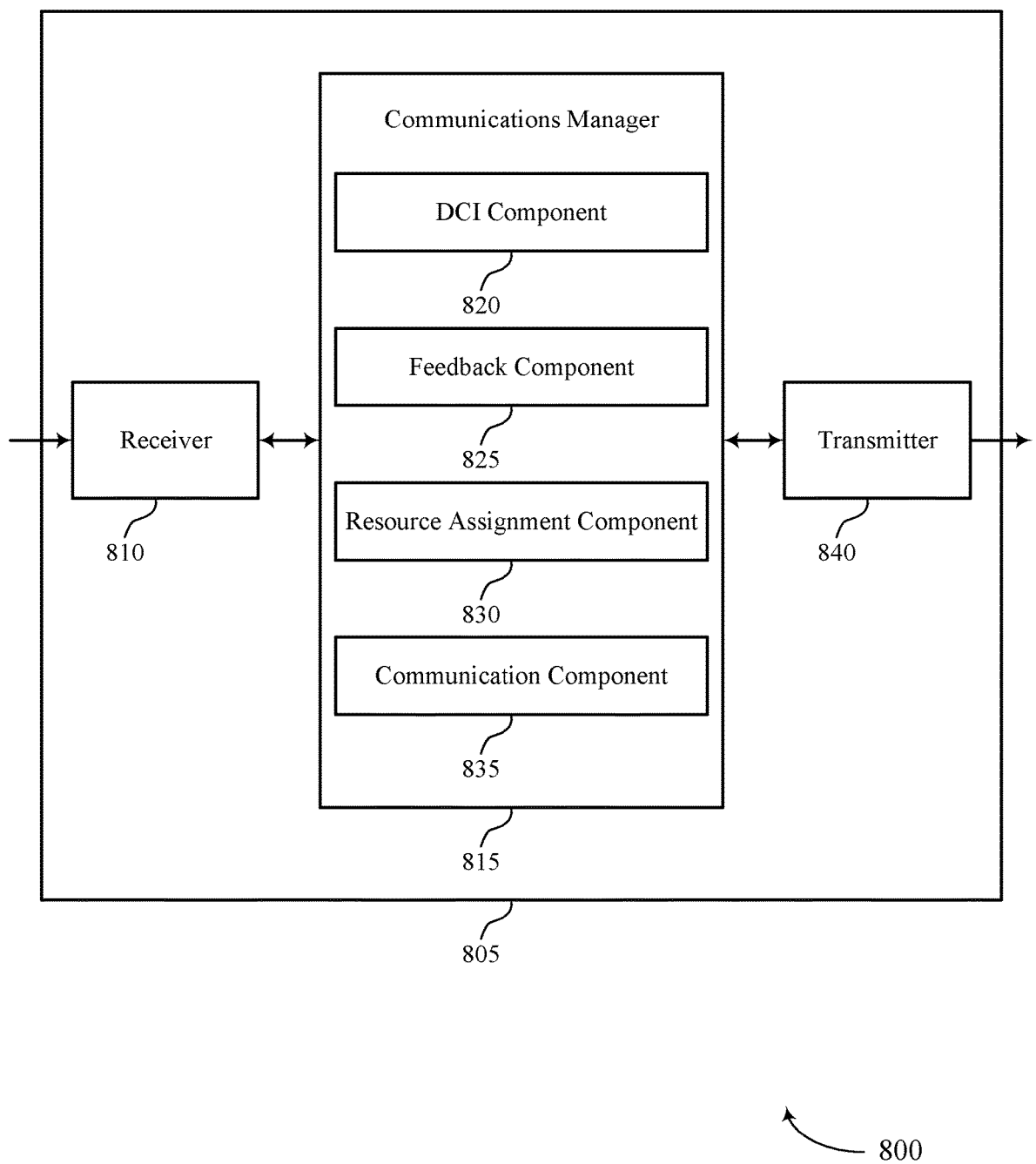

FIG. 8 shows a block diagram 800 of a device 805 that supports techniques for determining resource assignments for decode and forward relaying via DCI in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to techniques for determining resource assignments for decode and forward relaying via DCI, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a DCI component 820, a feedback component 825, a resource assignment component 830, and a communication component 835. The communications manager 815 may be an example of aspects of the communications manager 1010 described herein.

In some examples, the communications manager 815 may function as or operate within a first UE. The DCI component 820 may receive, from a base station, a first groupcast DCI message including a first grant for a first set of resources for the first UE for a first data transmission from the first UE and a second grant for a second set of resources for a second UE for a second data transmission from the second UE and receive, from the base station, a second groupcast DCI message based on receiving the negative acknowledgment from the base station and the positive ACK from the second UE. The feedback component 825 may receive, from the base station over a first downlink resource assigned for feedback, a NACK associated with the first data transmission from the first UE and, from the second UE over a resource assigned for feedback, a positive ACK associated with the first data transmission from the first UE. The resource assignment component 830 may determine a resource assignment for one or more of a retransmission of the first data transmission or a third data transmission based on a type of the second groupcast DCI message. The communication component 835 may transmit, to one or both of the second UE or the base station, the retransmission of the first data transmission or the third data transmission based on the resource assignment.

In some other examples, the communications manager 815 may function as or operate within a second UE. The DCI component 820 may receive, from a base station, a first groupcast DCI message including a first grant for a first set of resources for a first UE for a first data transmission from the first UE and a second grant for a second set of resources for the second UE for a second data transmission from the second UE and receive, from the base station, a second groupcast DCI message based on transmitting the positive ACK to the first UE and receiving the negative acknowledgment from the base station. The feedback component 825 may transmit, to the first UE over a resource assigned for feedback, a positive ACK associated with the first data transmission from the first UE and receive, from the base station over a first downlink resource assigned for feedback, a NACK associated with the second data transmission from the second UE. The resource assignment component 830 may determine a resource assignment for a retransmission of the second data transmission based on a type of the second groupcast DCI message. The communication component 835 may transmit, to the base station, the retransmission of the second data transmission based on the resource assignment.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
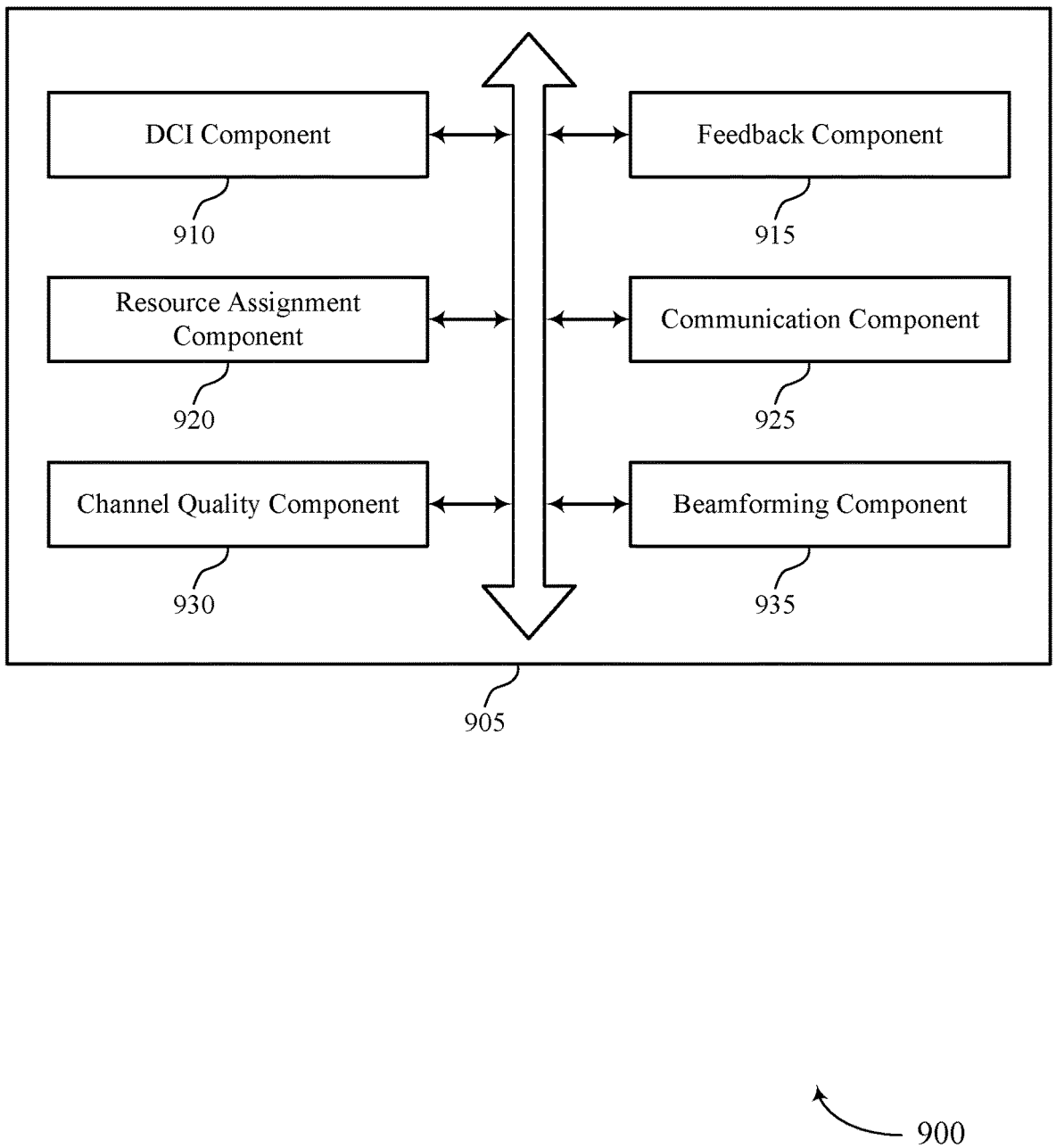
FIG. 9 shows a block diagram of a communications manager that supports techniques for determining resource assignments for decode and forward relaying via DCI in accordance with aspects of the present disclosure.

FIG. 9 shows a block diagram 900 of a communications manager 905 that supports techniques for determining resource assignments for decode and forward relaying via DCI in accordance with aspects of the present disclosure. The communications manager 905 may be an example of aspects of a communications manager 715, a communications manager 815, or a communications manager 1010 described herein. The communications manager 905 may include a DCI component 910, a feedback component 915, a resource assignment component 920, a communication component 925, a channel quality component 930, and a beamforming component 935. Each of these modules may communicate, directly or indirectly, with one another (e.g., via one or more buses).

The DCI component 910 may receive, from a base station, a first groupcast DCI message including a first grant for a first set of resources for the first UE for a first data transmission from the first UE and a second grant for a second set of resources for a second UE for a second data transmission from the second UE. In some examples, the DCI component 910 may receive, from the base station, a second groupcast DCI message based on receiving the NACK from the base station and the positive ACK from the second UE.

The feedback component 915 may receive, from the base station over a first downlink resource assigned for feedback, a NACK associated with the first data transmission from the first UE and, from the second UE over a resource assigned for feedback, a positive ACK associated with the first data transmission from the first UE.

The resource assignment component 920 may determine a resource assignment for one or more of a retransmission of the first data transmission or a third data transmission based on a type of the second groupcast DCI message. In some examples, the first set of resources includes a sidelink resource and an uplink resource, and transmitting the retransmission of the first data transmission or the third data transmission includes transmitting the retransmission of the first data transmission or the third data transmission to the second UE using the sidelink resource and to the base station using the uplink resource. In some examples, the first set of resources exclusively includes the uplink resource, and transmitting the retransmission of the first data transmission or the third data transmission includes transmitting the retransmission of the first data transmission or the third data transmission to the base station using the uplink resource.

In some examples, the resource assignment component 920 may determine a third grant for a third set of resources for the first UE and a fourth grant for a fourth set of resources for the second UE based on the type of the second groupcast DCI message. In some examples, the resource assignment component 920 may determine that the third grant for the third set of resources is for the third data transmission from the first UE and that the fourth grant for the fourth set of resources is for a retransmission of the second data transmission from the second UE based on an indication in the second groupcast DCI message. In some examples, the resource assignment component 920 may determine that the third grant for the third set of resources is for the retransmission of the first data transmission from the first UE and that the fourth grant for the fourth set of resources is for a retransmission of the second data transmission from the second UE based on an indication in the second groupcast DCI message.

In some examples, the resource assignment component 920 may determine that the third grant assigns a second downlink resource for feedback by the base station associated with a transmission from the first UE over the third uplink resource based on the type of the second groupcast DCI message. In some examples, the resource assignment component 920 may determine that the fourth grant assigns a third downlink resource for feedback by the base station associated with a transmission from the second UE over the fourth uplink resource based on the type of the second groupcast DCI message.

In some examples, the resource assignment component 920 may determine a third grant for a third set of resources for one or both of the first UE or the second UE based on the type of the second groupcast DCI message. In some examples, the resource assignment component 920 may determine that the third grant for the third set of resources is for both the retransmission of the first data transmission from the first UE and a retransmission of the second data transmission from the second UE based on an indication in the second groupcast DCI message.

In some examples, the resource assignment component 920 may determine that the third grant for the third set of resources is for either the retransmission of the first data transmission from the first UE or a retransmission of the second data transmission from the second UE based on an indication in the second groupcast DCI message. In some examples, the resource assignment component 920 may determine that the third grant assigns a second downlink resource for feedback by the base station associated with a transmission from one or both of the first UE or the second UE over the third uplink resource, where determining the resource assignment is based on determining that the third grant assigns the second downlink resource for feedback by the base station associated with the transmission from one or both of the first UE or the second UE over the third uplink resource.

In some examples, the resource assignment component 920 may determine that the first grant assigns the first uplink resource for the first data transmission from the first UE, assigns the first downlink resource for the feedback by the base station associated with the first data transmission from the first UE, and assigns the resource for the feedback by the second UE associated with the first data transmission from the first UE.

The communication component 925 may transmit, to the base station, the retransmission of the first data transmission or the third data transmission based on the resource assignment. In some examples, the communication component 925 may transmit, to the base station over the third uplink resource, the third data transmission. In some examples, the communication component 925 may transmit, to the base station over the third uplink resource, the retransmission of the first data transmission.

The channel quality component 930 may determine that a first channel quality associated with the first UE is greater than a second channel quality associated with the second UE based on the indication, where determining the resource assignment is based on determining that the first channel quality is greater than the second channel quality. In some examples, the channel quality component 930 may determine that the third grant for the third set of resources is for the retransmission of the first data transmission from the first UE based on determining that the first channel quality associated with the first UE is greater than the second channel quality associated with the second UE.

In some examples, the beamforming component 935 may transmit the retransmission of the second data transmission to the base station using a beamforming technique.

In some examples, the DCI component 910 may receive, from a base station, a first groupcast DCI message including a first grant for a first UE associated with a first uplink resource for a first data transmission from the first UE and a second grant for the second UE associated with a second uplink resource for a second data transmission from the second UE. In some examples, the DCI component 910 may receive, from the base station, a second groupcast DCI message based on transmitting the positive ACK to the first UE and receiving the negative acknowledgment from the base station.

In some examples, the feedback component 915 may transmit, to the first UE over a resource assigned for feedback, a positive ACK associated with the first data transmission from the first UE. In some examples, the feedback component 915 may receive, from the base station over a first downlink resource assigned for feedback, a NACK associated with the second data transmission from the second UE.

In some examples, the resource assignment component 920 may determine a resource assignment for a retransmission of the second data transmission based on a type of the second groupcast DCI message. In some cases, the first data transmission and the second data transmission include identical data originating at the first UE.

In some examples, the resource assignment component 920 may determine a third grant for a third set of resources for the first UE and a fourth grant for a fourth set of resources for the second UE based on the type of the second groupcast DCI message. In some examples, the resource assignment component 920 may determine that the third grant for the third set of resources is for a third data transmission from the first UE and that the fourth grant for the fourth set of resources is for the retransmission of the second data transmission from the second UE based on an indication in the second groupcast DCI message. In some examples, the resource assignment component 920 may determine that the third grant for the third set of resources is for a retransmission of the first data transmission from the first UE and that the fourth grant for the fourth set of resources is for the retransmission of the second data transmission from the second UE based on an indication in the second groupcast DCI message.

In some examples, the resource assignment component 920 may determine that the third grant assigns a second downlink resource for feedback by the base station associated with a transmission from the first UE over the third uplink resource based on the type of the second groupcast DCI message. In some examples, the resource assignment component 920 may determine that the fourth grant assigns a third downlink resource for feedback by the base station associated with a transmission from the second UE over the fourth uplink resource based on the type of the second groupcast DCI message, where determining the resource assignment is based on determining that the third grant assigns the second downlink resource for feedback by the base station associated with the transmission from the first UE over the third uplink resource and that the fourth grant assigns the third downlink resource for feedback by the base station associated with the transmission from the second UE over the fourth uplink resource.

In some examples, the resource assignment component 920 may determine a third grant for a third set of resources for one or both of the first UE or the second UE based on the type of the second groupcast DCI message. In some examples, the resource assignment component 920 may determine that the third grant for the third set of resources is for both a retransmission of the first data transmission from the first UE and the retransmission of the second data transmission from the second UE based on an indication in the second groupcast DCI message. In some examples, the resource assignment component 920 may determine that the third grant for the third set of resources is for either of a retransmission of the first data transmission from the first UE or the retransmission of the second data transmission from the second UE based on an indication in the second groupcast DCI message.

In some examples, the resource assignment component 920 may determine that the third grant assigns a second downlink resource for feedback by the base station associated with a transmission from one or both of the first UE or the second UE over the third uplink resource, where determining the resource assignment is based on determining that the third grant assigns the second downlink resource for feedback by the base station associated with the transmission from one or both of the first UE or the second UE over the third uplink resource.

In some cases, the first data transmission and the second data transmission include identical data originating at the first UE and the third data transmission includes fresh data originating at the first UE. In some cases, the second grant assigns the second uplink resource for the second data transmission from the second UE and assigns the first downlink resource for the feedback by the base station associated with the first data transmission from the second UE.

In some examples, the communication component 925 may transmit, to the base station, the retransmission of the second data transmission based on the resource assignment.

In some examples, the channel quality component 930 may determine that a first channel quality associated with the first UE is less than a second channel quality associated with the second UE based on the indication, where determining the resource assignment is based on determining that the first channel quality associated with the first UE is less than the second channel quality associated with the second UE. In some examples, the channel quality component 930 may determine that the third grant for the third set of resources is for the retransmission of the second data transmission from the second UE based on determining that the first channel quality associated with the first UE is less than the second channel quality associated with the second UE.

The beamforming component 935 may transmit the retransmission of the first data transmission or the third data transmission to the base station using a beamforming technique.

Figure 10:
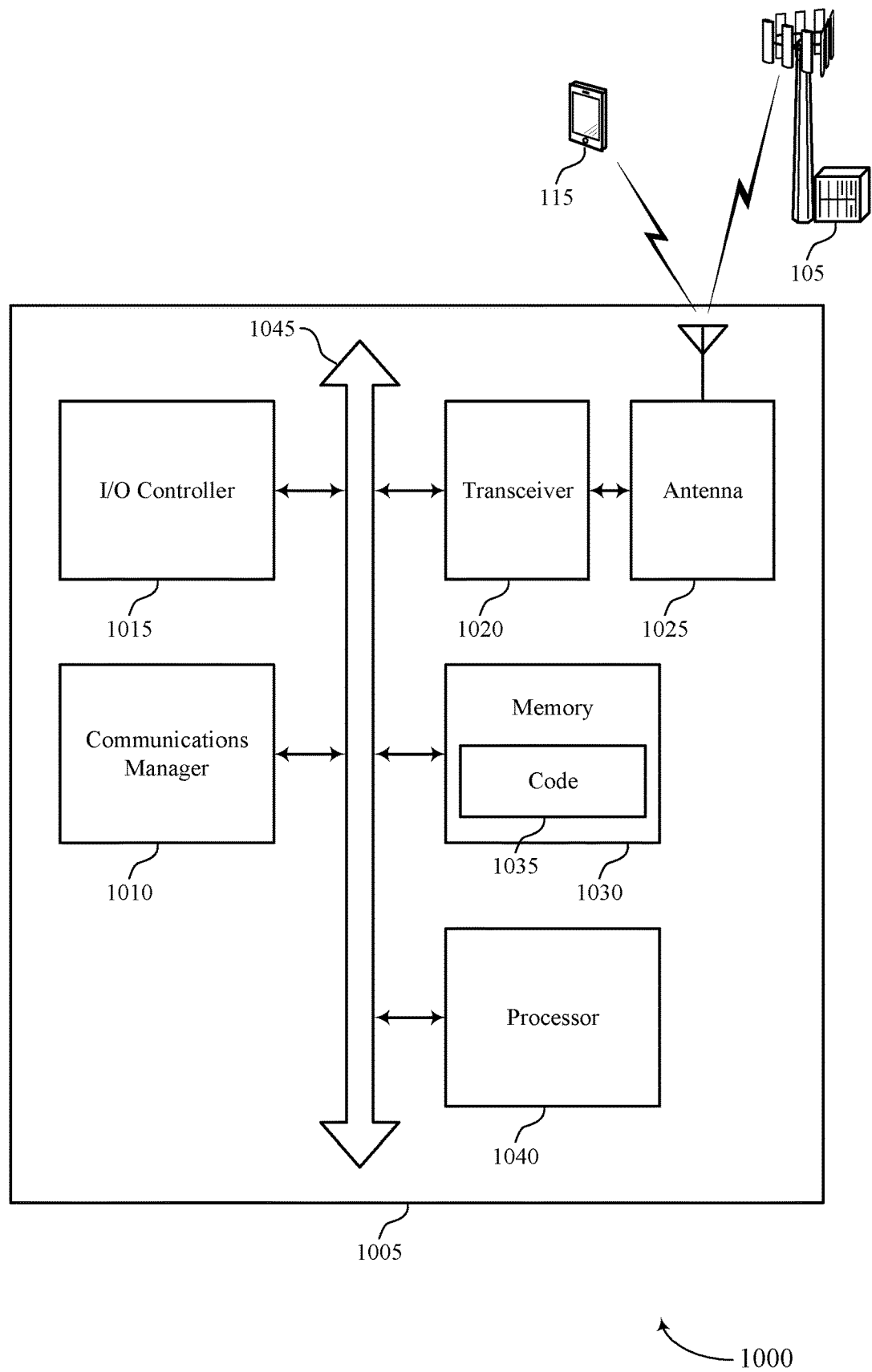
FIG. 10 shows a diagram of a system including a device that supports techniques for determining resource assignments for decode and forward relaying via DCI in accordance with aspects of the present disclosure.

FIG. 10 shows a diagram of a system 1000 including a device 1005 that supports techniques for determining resource assignments for decode and forward relaying via DCI in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

In some examples, the communications manager 1010 may function as or operate with a first UE. In such examples, the communications manager 1010 may receive, from a base station, a first groupcast DCI message including a first grant for a first set of resources for the first UE for a first data transmission from the first UE and a second grant for a second set of resources for a second UE for a second data transmission from the second UE. In some examples, the communications manager 1010 may receive, from the base station, a second groupcast DCI message based on receiving the negative acknowledgment from the base station and the positive ACK from the second UE. In some examples, the communications manager 1010 may receive, from the base station over a first downlink resource assigned for feedback, a NACK associated with the first data transmission from the first UE and, from the second UE over a resource assigned for feedback, a positive ACK associated with the first data transmission from the first UE. In some examples, the communications manager 1010 may determine a resource assignment for one or more of a retransmission of the first data transmission or a third data transmission based on a type of the second groupcast DCI message. In some examples, the communications manager 1010 may transmit, to one or both of the second UE or the base station, the retransmission of the first data transmission or the third data transmission based on the resource assignment.

In some other examples, the communications manager 1010 may function as or operate with a second UE. In such examples, the communications manager 1010 may receive, from a base station, a first groupcast DCI message including a first grant for a first set of resources for a first UE for a first data transmission from the first UE and a second grant for a second set of resources for the second UE for a second data transmission from the second UE. In some examples, the communications manager 1010 may receive, from the base station, a second groupcast DCI message based on transmitting the positive ACK to the first UE and receiving the negative acknowledgment from the base station. In some examples, the communications manager 1010 may transmit, to the first UE over a resource assigned for feedback, a positive ACK associated with the first data transmission from the first UE. In some examples, the communications manager 1010 may receive, from the base station over a first downlink resource assigned for feedback, a NACK associated with the second data transmission from the second UE. In some examples, the communications manager 1010 may determine a resource assignment for a retransmission of the second data transmission based on a type of the second groupcast DCI message. In some examples, the communications manager 1010 may transmit, to the base station, the retransmission of the second data transmission based on the resource assignment.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for determining resource assignments for decode and forward relaying via DCI).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
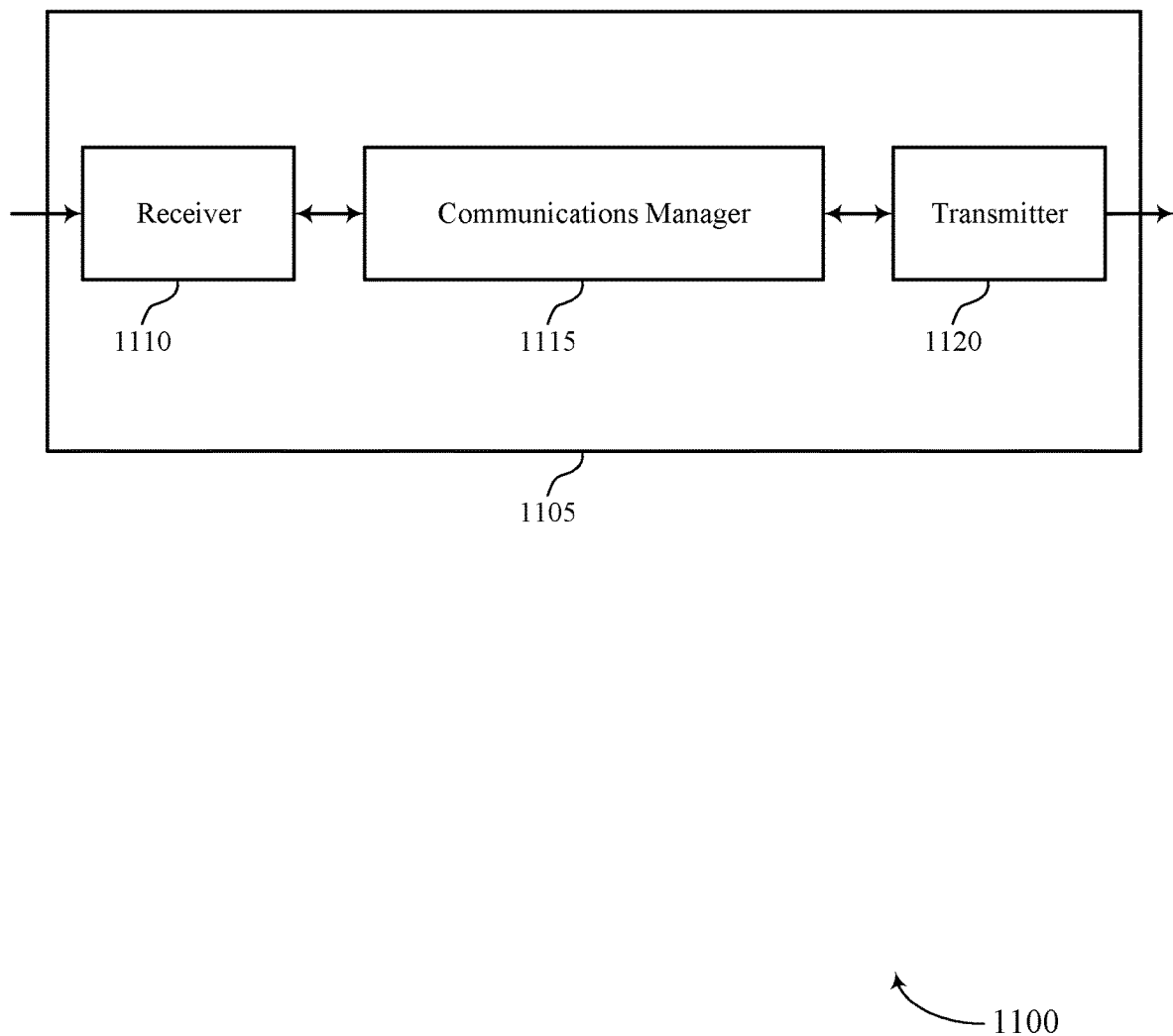
FIGS. 11 and 12 show block diagrams of devices that support techniques for determining resource assignments for decode and forward relaying via DCI in accordance with aspects of the present disclosure.

FIG. 11 shows a block diagram 1100 of a device 1105 that supports techniques for determining resource assignments for decode and forward relaying via DCI in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for determining resource assignments for decode and forward relaying via DCI, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to the first UE and the second UE, a first groupcast DCI message including a first grant for a first set of resources for a first UE for a first data transmission from the first UE and a second grant for a second set of resources for a second UE for a second data transmission from the second UE. The communications manager 1115 may determine a type of a second groupcast DCI message based on a resource assignment for one or more of a retransmission of the first data transmission from the first UE, a third data transmission from the first UE, or a retransmission of the second data transmission from the second UE. The communications manager 1115 may transmit, to the first UE and the second UE, the second groupcast DCI message, transmit, to the first UE over a first downlink resource assigned for feedback, a first NACK associated with the first data transmission from the first UE and, to the second UE over a second downlink resource assigned for feedback, a second NACK associated with the second data transmission from the second UE. The communications manager 1115 may receive, from one or both of the first UE or the second UE, the retransmission of the first data transmission, the third data transmission, or the retransmission of the second data transmission based on the type of the second groupcast DCI message. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

The communications manager 1115 may be implemented to realize one or more potential advantages. In some implementations, the communications manager 1115 may coordinate resource usage for either a retransmission of old data or a transmission of new data within a decode and forward relaying procedure, which may support more efficient resource usage as well as increasing reliability while maintaining low latency associated with data transmissions from UEs to the device 1105. Such added resource efficiency and increased reliability may result in less interference within the system as well as fewer potential retransmissions, which may improve power savings at the communications manager 1115.

Figure 12:
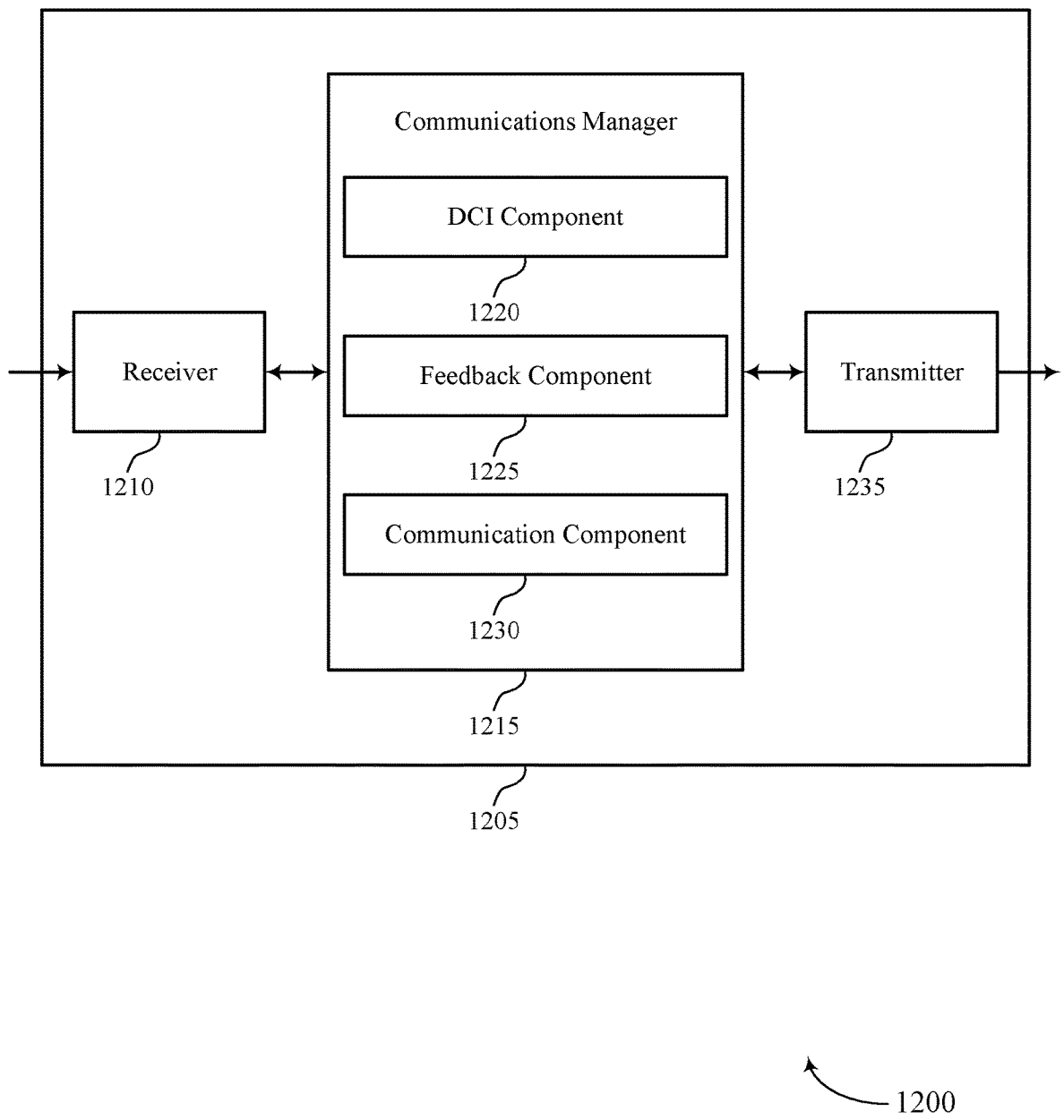

FIG. 12 shows a block diagram 1200 of a device 1205 that supports techniques for determining resource assignments for decode and forward relaying via DCI in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for determining resource assignments for decode and forward relaying via DCI, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a DCI component 1220, a feedback component 1225, and a communication component 1230. The communications manager 1215 may be an example of aspects of the communications manager 1410 described herein.

The DCI component 1220 may transmit, to the first UE and the second UE, a first groupcast DCI message including a first grant for a first set of resources for a first UE for a first data transmission from the first UE and a second grant for a second set of resources for a second UE for a second data transmission from the second UE, determine a type of a second groupcast DCI message based on a resource assignment for one or more of a retransmission of the first data transmission from the first UE, a third data transmission from the first UE, or a retransmission of the second data transmission from the second UE, and transmit, to the first UE and the second UE, the second groupcast DCI message. The feedback component 1225 may transmit, to the first UE over a first downlink resource assigned for feedback, a first NACK associated with the first data transmission from the first UE and, to the second UE over a second downlink resource assigned for feedback, a second NACK associated with the second data transmission from the second UE.

The communication component 1230 may receive, from one or both of the first UE or the second UE, the retransmission of the first data transmission, the third data transmission, or the retransmission of the second data transmission based on the type of the second groupcast DCI message. The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
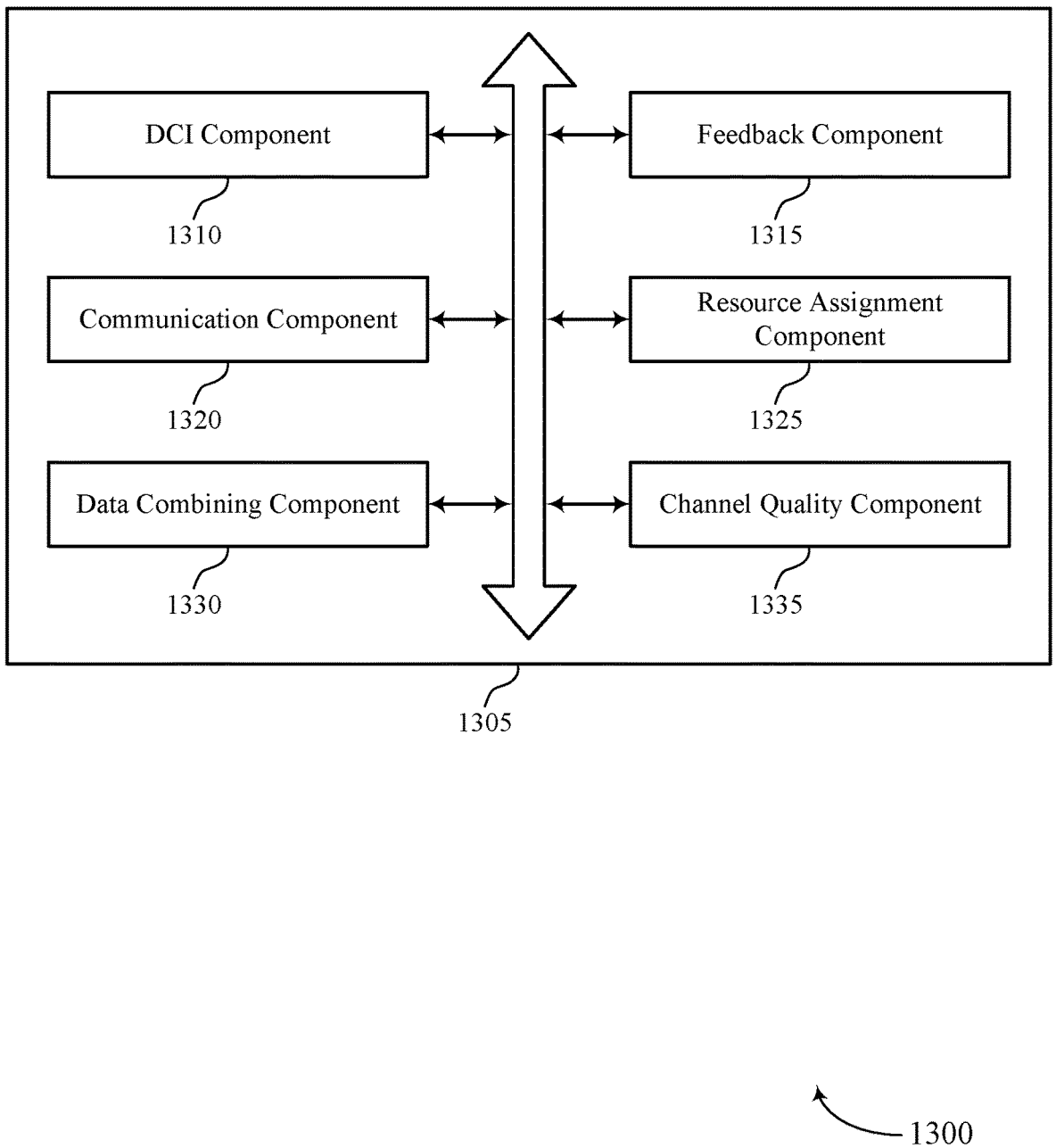
FIG. 13 shows a block diagram of a communications manager that supports techniques for determining resource assignments for decode and forward relaying via DCI in accordance with aspects of the present disclosure.

FIG. 13 shows a block diagram 1300 of a communications manager 1305 that supports techniques for determining resource assignments for decode and forward relaying via DCI in accordance with aspects of the present disclosure. The communications manager 1305 may be an example of aspects of a communications manager 1115, a communications manager 1215, or a communications manager 1410 described herein. The communications manager 1305 may include a DCI component 1310, a feedback component 1315, a communication component 1320, a resource assignment component 1325, a data combining component 1330, and a channel quality component 1335. Each of these modules may communicate, directly or indirectly, with one another (e.g., via one or more buses).

The DCI component 1310 may transmit, to the first UE and the second UE, a first groupcast DCI message including a first grant for a first set of resources for a first UE for a first data transmission from the first UE and a second grant for a second set of resources for a second UE for a second data transmission from the second UE. In some examples, the DCI component 1310 may determine a type of a second groupcast DCI message based on a resource assignment for one or more of a retransmission of the first data transmission from the first UE, a third data transmission from the first UE, or a retransmission of the second data transmission from the second UE.

In some examples, the DCI component 1310 may transmit, to the first UE and the second UE, the second groupcast DCI message. In some examples, the DCI component 1310 may transmit, in the second groupcast DCI message, an indication that the third grant for the third set of resources is for the third data transmission from the first UE and that the fourth grant for the fourth set of resources is for the retransmission of the second data transmission from the second UE. In some examples, the DCI component 1310 may transmit, in the second groupcast DCI message, an indication that the third grant for the third set of resources is for the retransmission of the first data transmission from the first UE and that the fourth grant for the fourth set of resources is for the retransmission of the second data transmission from the second UE.

In some examples, the DCI component 1310 may transmit, in the second groupcast DCI message, an indication that the third grant for the third set of resources is for either of the retransmission of the first data transmission from the first UE or the retransmission of the second data transmission from the second UE.

The feedback component 1315 may transmit, to the first UE over a first downlink resource assigned for feedback, a first NACK associated with the first data transmission from the first UE and, to the second UE over a second downlink resource assigned for feedback, a second NACK associated with the second data transmission from the second UE.

The communication component 1320 may receive, from one or both of the first UE or the second UE, the retransmission of the first data transmission, the third data transmission, or the retransmission of the second data transmission based on the type of the second groupcast DCI message.

The resource assignment component 1325 may determine a third grant for a third set of resources for the first UE and a fourth grant for a fourth set of resources for the second UE, where the resource assignment is based on the third uplink grant being for the first UE and the fourth uplink grant being for the second UE.

In some examples, the resource assignment component 1325 may assign the third grant for the third set of resources for the third data transmission from the first UE and the fourth grant for the fourth set of resources for the retransmission of the second data transmission from the second UE. In some examples, the resource assignment component 1325 may assign the third grant for the third set of resources for the retransmission of the first data transmission from the first UE and the fourth grant for the fourth set of resources for the retransmission of the second data transmission from the second UE.

In some examples, the resource assignment component 1325 may determine a third downlink resource for feedback by the base station associated with a transmission from the first UE over the third uplink resource. In some examples, the resource assignment component 1325 may determine a fourth downlink resource for feedback by the base station associated with a transmission from the second UE over the second uplink resource, where the resource assignment is based on the third downlink resource being for feedback to the first UE and the fourth downlink resource being for feedback to the second UE. In some examples, the resource assignment component 1325 may determine a third grant for a third set of resources for one or both of the first UE or the second UE, where the resource assignment is based on the third uplink grant being for one or both of the first UE or the second UE.

In some examples, the resource assignment component 1325 may assign the third grant for the third set of resources for both of the retransmission of the first data transmission from the first UE and the retransmission of the second data transmission from the second UE, where the resource assignment is based on assigning the third grant for the third set of resources for both of the retransmission of the first data transmission from the first UE and the retransmission of the second data transmission from the second UE. In some examples, the resource assignment component 1325 may assign the third grant for the third set of resources for either of the retransmission of the first data transmission from the first UE or the retransmission of the second data transmission from the second UE.

In some examples, the resource assignment component 1325 may determine a third downlink resource for feedback by the base station associated with a transmission from one or both of the first UE or the second UE over the third uplink resource, where the resource assignment is based on the third downlink resource being for feedback to one or both of the first UE or the second UE. In some cases, the first data transmission and the second data transmission include identical data originating at the first UE and the third data transmission includes fresh data originating at the first UE.

The data combining component 1330 may combine the retransmission of the first data transmission from the first UE and the retransmission of the second data transmission from the second UE, where receiving the retransmission of the first data transmission and the retransmission of the second data transmission is based on combining the retransmission of the first data transmission from the first UE and the retransmission of the second data transmission from the second UE.

The channel quality component 1335 may determine a first channel quality associated with the first UE and a second channel quality associated with the second UE. In some examples, the channel quality component 1335 may determine that the first channel quality is greater than or less than the second channel quality. In some examples, the channel quality component 1335 may determine the indication based on determining that the first channel quality is greater than or less than the second channel quality, where the resource assignment is based on determining the indication.

Figure 14:
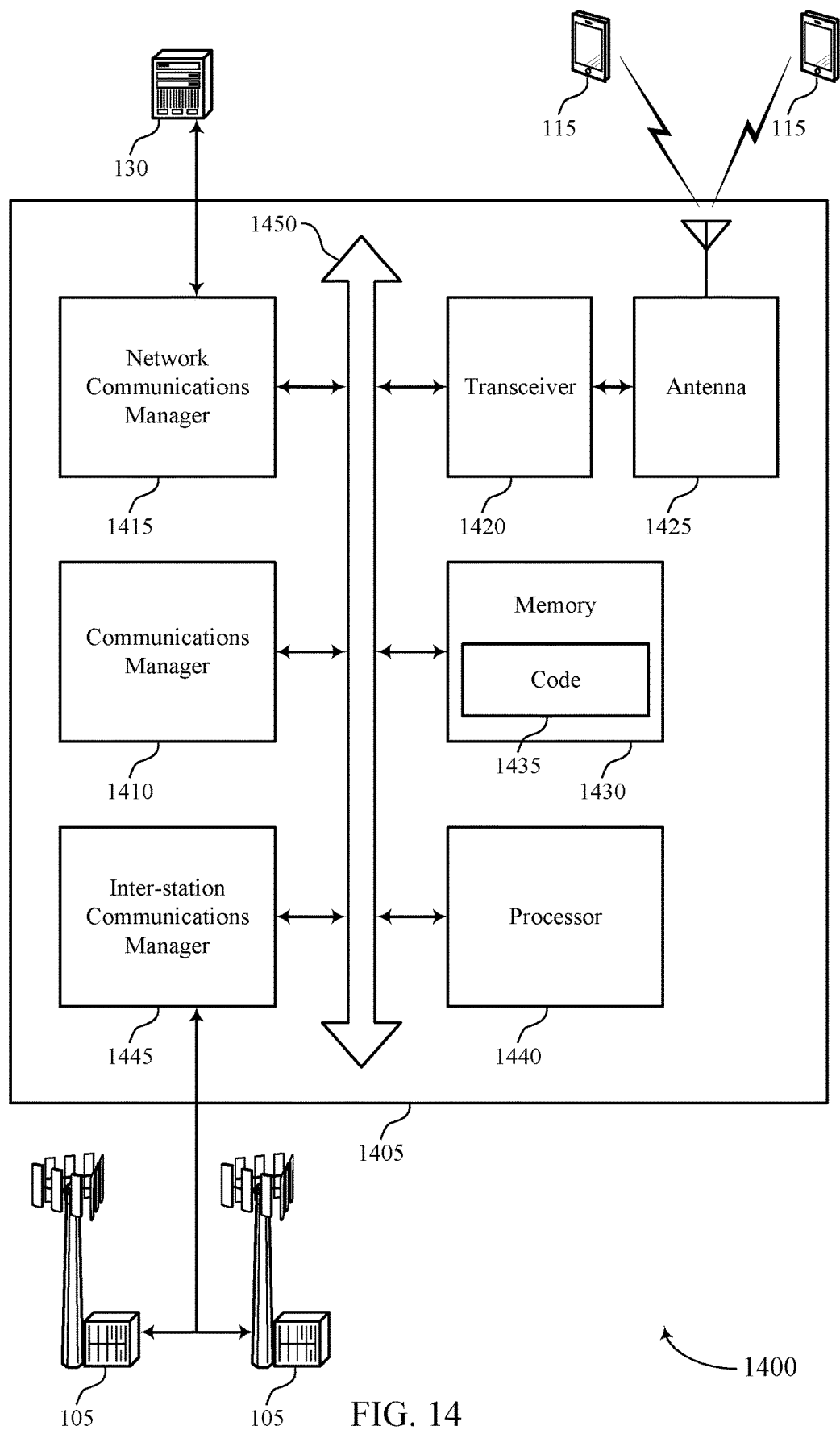
FIG. 14 shows a diagram of a system including a device that supports techniques for determining resource assignments for decode and forward relaying via DCI in accordance with aspects of the present disclosure.

FIG. 14 shows a diagram of a system 1400 including a device 1405 that supports techniques for determining resource assignments for decode and forward relaying via DCI in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to the first UE and the second UE, a first groupcast DCI message including a first grant for a first set of resources for a first UE for a first data transmission from the first UE and a second grant for a second set of resources for a second UE for a second data transmission from the second UE. The communications manager 1410 may determine a type of a second groupcast DCI message based on a resource assignment for one or more of a retransmission of the first data transmission from the first UE, a third data transmission from the first UE, or a retransmission of the second data transmission from the second UE. The communications manager 1410 may transmit, to the first UE and the second UE, the second groupcast DCI message, transmit, to the first UE over a first downlink resource assigned for feedback, a first NACK associated with the first data transmission from the first UE and, to the second UE over a second downlink resource assigned for feedback, a second NACK associated with the second data transmission from the second UE. The communications manager 1410 may receive, from one or both of the first UE or the second UE, the retransmission of the first data transmission, the third data transmission, or the retransmission of the second data transmission based on the type of the second groupcast DCI message.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting techniques for determining resource assignments for decode and forward relaying via DCI).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
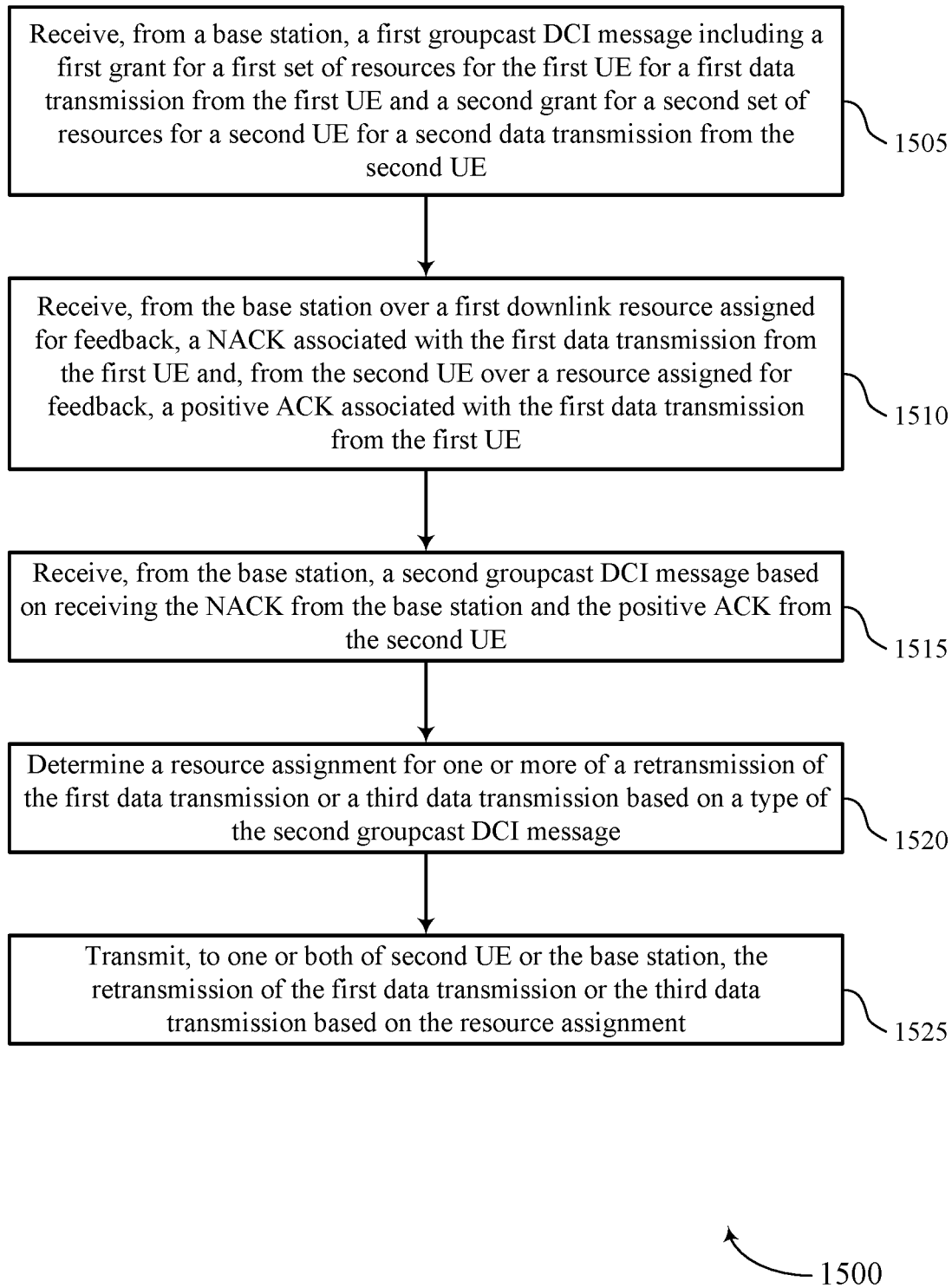
FIGS. 15 through 17 show flowcharts illustrating methods that support techniques for determining resource assignments for decode and forward relaying via DCI in accordance with aspects of the present disclosure.

FIG. 15 shows a flowchart illustrating a method 1500 that supports techniques for determining resource assignments for decode and forward relaying via DCI in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, a first groupcast DCI message including a first grant for a first set of resources for the first UE for a first data transmission from the first UE and a second grant for a second set of resources for a second UE for a second data transmission from the second UE. The operations of 1505 may be performed according to the methods described herein. In some examples, aspects of the operations of 1505 may be performed by a DCI component as described with reference to FIGS. 7 through 10.

At 1510, the UE may receive, from the base station over a first downlink resource assigned for feedback, a NACK associated with the first data transmission from the first UE and, from the second UE over a resource assigned for feedback, a positive ACK associated with the first data transmission from the first UE. The operations of 1510 may be performed according to the methods described herein. In some examples, aspects of the operations of 1510 may be performed by a feedback component as described with reference to FIGS. 7 through 10.

At 1515, the UE may receive, from the base station, a second groupcast DCI message based on receiving the NACK from the base station and the positive ACK from the second UE. The operations of 1515 may be performed according to the methods described herein. In some examples, aspects of the operations of 1515 may be performed by a DCI component as described with reference to FIGS. 7 through 10.

At 1520, the UE may determine a resource assignment for one or more of a retransmission of the first data transmission or a third data transmission based on a type of the second groupcast DCI message. The operations of 1520 may be performed according to the methods described herein. In some examples, aspects of the operations of 1520 may be performed by a resource assignment component as described with reference to FIGS. 7 through 10.

At 1525, the UE may transmit, to one or both of the second UE or the base station, the retransmission of the first data transmission or the third data transmission based on the resource assignment. The operations of 1525 may be performed according to the methods described herein. In some examples, aspects of the operations of 1525 may be performed by a communication component as described with reference to FIGS. 7 through 10.

Figure 16:
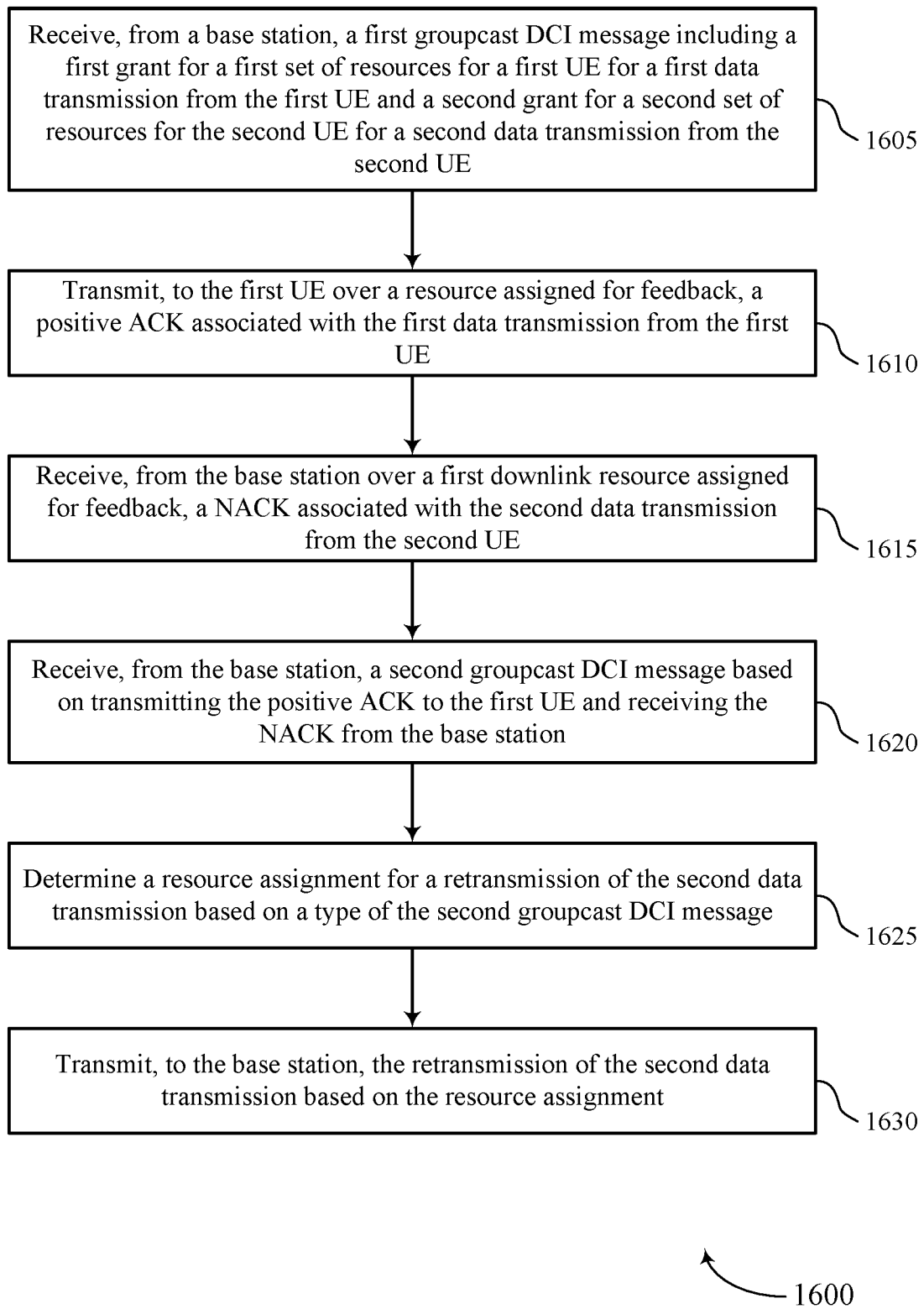

FIG. 16 shows a flowchart illustrating a method 1600 that supports techniques for determining resource assignments for decode and forward relaying via DCI in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, a first groupcast DCI message including a first grant for a first set of resources for a first UE for a first data transmission from the first UE and a second grant for a second set of resources for the second UE for a second data transmission from the second UE. The operations of 1605 may be performed according to the methods described herein. In some examples, aspects of the operations of 1605 may be performed by a DCI component as described with reference to FIGS. 7 through 10.

At 1610, the UE may transmit, to the first UE over a resource assigned for feedback, a positive ACK associated with the first data transmission from the first UE. The operations of 1610 may be performed according to the methods described herein. In some examples, aspects of the operations of 1610 may be performed by a feedback component as described with reference to FIGS. 7 through 10.

At 1615, the UE may receive, from the base station over a first downlink resource assigned for feedback, a NACK associated with the second data transmission from the second UE. The operations of 1615 may be performed according to the methods described herein. In some examples, aspects of the operations of 1615 may be performed by a feedback component as described with reference to FIGS. 7 through 10.

At 1620, the UE may receive, from the base station, a second groupcast DCI message based on transmitting the positive ACK to the first UE and receiving the negative acknowledgment from the base station. The operations of 1620 may be performed according to the methods described herein. In some examples, aspects of the operations of 1620 may be performed by a DCI component as described with reference to FIGS. 7 through 10.

At 1625, the UE may determine a resource assignment for a retransmission of the second data transmission based on a type of the second groupcast DCI message. The operations of 1625 may be performed according to the methods described herein. In some examples, aspects of the operations of 1625 may be performed by a resource assignment component as described with reference to FIGS. 7 through 10.

At 1630, the UE may transmit, to the base station, the retransmission of the second data transmission based on the resource assignment. The operations of 1630 may be performed according to the methods described herein. In some examples, aspects of the operations of 1630 may be performed by a communication component as described with reference to FIGS. 7 through 10.

Figure 17:
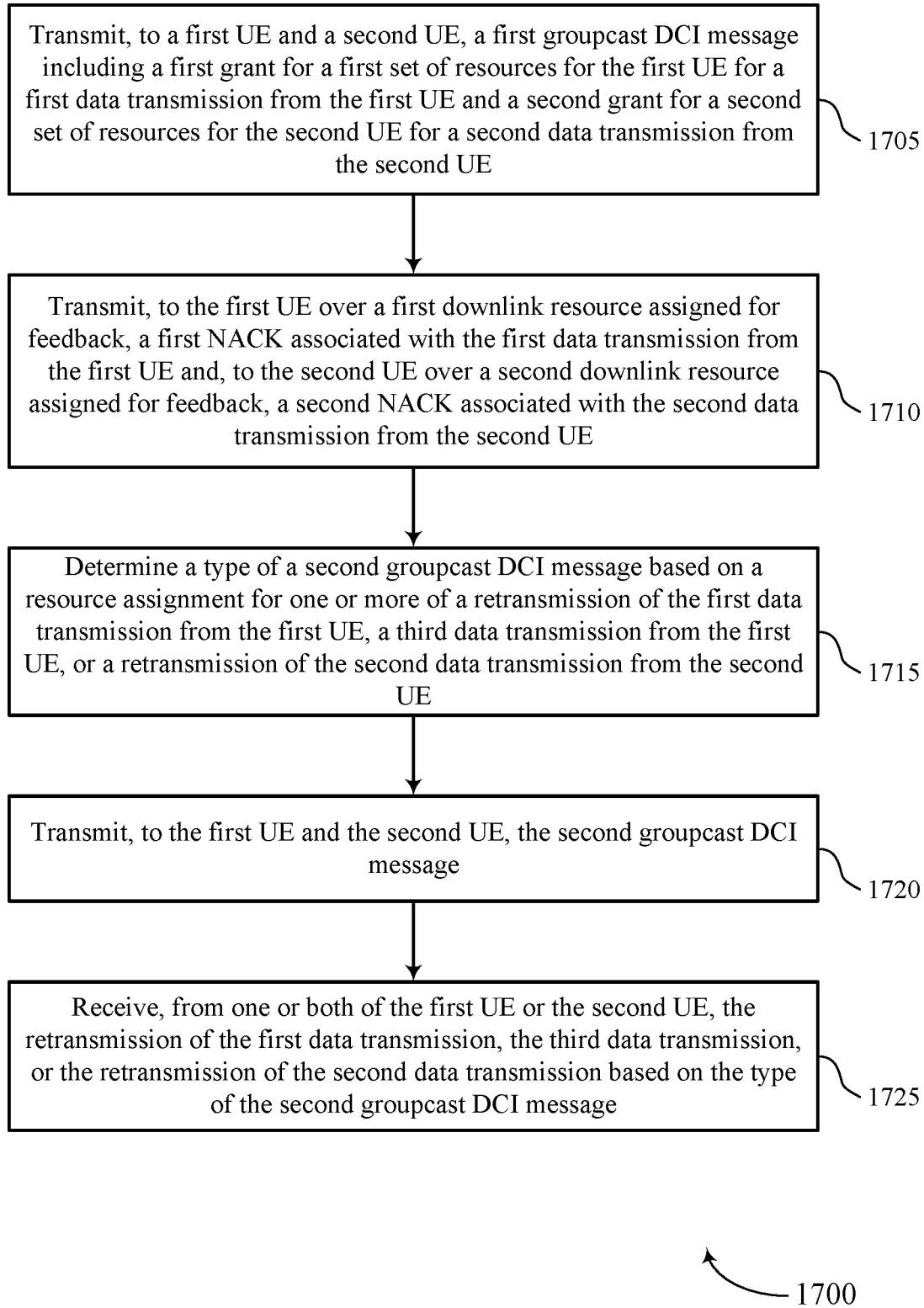

FIG. 17 shows a flowchart illustrating a method 1700 that supports techniques for determining resource assignments for decode and forward relaying via DCI in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1705, the base station may transmit, to a first UE and a second UE, a first groupcast DCI message including a first grant for a first set of resources for the first UE for a first data transmission from the first UE and a second grant for a second set of resources for the second UE for a second data transmission from the second UE. The operations of 1705 may be performed according to the methods described herein. In some examples, aspects of the operations of 1705 may be performed by a DCI component as described with reference to FIGS. 11 through 14.

At 1710, the base station may transmit, to the first UE over a first downlink resource assigned for feedback, a first NACK associated with the first data transmission from the first UE and, to the second UE over a second downlink resource assigned for feedback, a second NACK associated with the second data transmission from the second UE. The operations of 1710 may be performed according to the methods described herein. In some examples, aspects of the operations of 1710 may be performed by a feedback component as described with reference to FIGS. 11 through 14.

At 1715, the base station may determine a type of a second groupcast DCI message based on a resource assignment for one or more of a retransmission of the first data transmission from the first UE, a third data transmission from the first UE, or a retransmission of the second data transmission from the second UE. The operations of 1715 may be performed according to the methods described herein. In some examples, aspects of the operations of 1715 may be performed by a DCI component as described with reference to FIGS. 11 through 14.

At 1720, the base station may transmit, to the first UE and the second UE, the second groupcast DCI message. The operations of 1720 may be performed according to the methods described herein. In some examples, aspects of the operations of 1720 may be performed by a DCI component as described with reference to FIGS. 11 through 14.

At 1725, the base station may receive, from one or both of the first UE or the second UE, the retransmission of the first data transmission, the third data transmission, or the retransmission of the second data transmission based on the type of the second groupcast DCI message. The operations of 1725 may be performed according to the methods described herein. In some examples, aspects of the operations of 1725 may be performed by a communication component as described with reference to FIGS. 11 through 14.

The following provides an overview of aspects of the present disclosure:

Aspect 1: A method for wireless communication at a first UE, comprising: receiving, from a base station, a first groupcast DCI message including a first grant for a first set of resources for the first UE for a first data transmission from the first UE and a second grant for a second set of resources for a second UE for a second data transmission from the second UE; receiving, from the base station over a first downlink resource assigned for feedback, a NACK associated with the first data transmission from the first UE and, from the second UE over a resource assigned for feedback, a positive ACK associated with the first data transmission from the first UE; receiving, from the base station, a second groupcast DCI message based at least in part on receiving the NACK from the base station and the positive ACK from the second UE; determining a resource assignment for one or more of a retransmission of the first data transmission or a third data transmission based at least in part on a type of the second groupcast DCI message; and transmitting, to one or both of the second UE or the base station, the retransmission of the first data transmission or the third data transmission based at least in part on the resource assignment.

Aspect 2: The method of aspect 1, wherein determining the resource assignment comprises: determining a third grant for a third set of resources for the first UE and a fourth grant for a fourth set of resources for the second UE based at least in part on the type of the second groupcast DCI message.

Aspect 3: The method of aspect 2, wherein determining the resource assignment further comprises: determining that the third grant for the third set of resources is for the third data transmission from the first UE and that the fourth grant for the fourth set of resources is for a retransmission of the second data transmission from the second UE based at least in part on an indication in the second groupcast DCI message; and wherein transmitting the retransmission of the first data transmission or the third data transmission to the base station comprises: transmitting, to one or both of the second UE or the base station over the third set of resources, the third data transmission.

Aspect 4: The method of aspect 2, wherein determining the resource assignment further comprises: determining that the third grant for the third set of resources is for the retransmission of the first data transmission from the first UE and that the fourth grant for the fourth set of resources is for a retransmission of the second data transmission from the second UE based at least in part on an indication in the second groupcast DCI message; and wherein transmitting the retransmission of the first data transmission or the third data transmission to the base station comprises: transmitting, to one or both of the second UE or the base station over the third set of resources, the retransmission of the first data transmission.

Aspect 5: The method of any of aspects 2 through 4, further comprising: determining that the third grant assigns a second downlink resource for feedback by the base station associated with a transmission from the first UE over the third set of resources based at least in part on the type of the second groupcast DCI message; and determining that the fourth grant assigns a third downlink resource for feedback by the base station associated with a transmission from the second UE over the fourth set of resources based at least in part on the type of the second groupcast DCI message.

Aspect 6: The method of any of aspects 1 through 5, wherein determining the resource assignment comprises: determining a third grant for a third set of resources for one or both of the first UE or the second UE based at least in part on the type of the second groupcast DCI message.

Aspect 7: The method of aspect 6, wherein determining the resource assignment further comprises: determining that the third grant for the third set of resources is for both the retransmission of the first data transmission from the first UE and a retransmission of the second data transmission from the second UE based at least in part on an indication in the second groupcast DCI message; and wherein transmitting the retransmission of the first data transmission or the third data transmission to the base station comprises: transmitting, to one or both of the second UE or the base station over the third set of resources, the retransmission of the first data transmission.

Aspect 8: The method of aspect 6, wherein determining the resource assignment further comprises: determining that the third grant for the third set of resources is for either the retransmission of the first data transmission from the first UE or a retransmission of the second data transmission from the second UE based at least in part on an indication in the second groupcast DCI message.

Aspect 9: The method of aspect 8, further comprising: determining that a first channel quality associated with the first UE is greater than a second channel quality associated with the second UE based at least in part on the indication, wherein determining the resource assignment is based at least in part on determining that the first channel quality is greater than the second channel quality.

Aspect 10: The method of aspect 9, wherein determining the resource assignment further comprises: determining that the third grant for the third set of resources is for the retransmission of the first data transmission from the first UE based at least in part on determining that the first channel quality associated with the first UE is greater than the second channel quality associated with the second UE; and wherein transmitting the retransmission of the first data transmission or the third data transmission to the base station comprises: transmitting, to one or both of the second UE or the base station over the third set of resources, the retransmission of the first data transmission.

Aspect 11: The method of any of aspects 6 through 10, further comprising: determining that the third grant assigns a second downlink resource for feedback by the base station associated with a transmission from one or both of the first UE or the second UE over the third set of resources, wherein determining the resource assignment is based at least in part on determining that the third grant assigns the second downlink resource for feedback by the base station associated with the transmission from one or both of the first UE or the second UE over the third set of resources.

Aspect 12: The method of any of aspects 1 through 11, wherein transmitting the retransmission of the first data transmission or the third data transmission to one or both of the second UE or the base station comprises: transmitting the retransmission of the first data transmission or the third data transmission to one or both of the second UE or the base station using a beamforming technique.

Aspect 13: The method of any of aspects 1 through 12, wherein the first data transmission and the second data transmission comprise identical data originating at the first UE and the third data transmission comprises fresh data originating at the first UE.

Aspect 14: The method of any of aspects 1 through 13, wherein the first set of resources includes a sidelink resource and an uplink resource, and wherein transmitting the retransmission of the first data transmission or the third data transmission comprises transmitting the retransmission of the first data transmission or the third data transmission to the second UE using the sidelink resource and to the base station using the uplink resource; or the first set of resources exclusively includes the uplink resource, and wherein transmitting the retransmission of the first data transmission or the third data transmission comprises transmitting the retransmission of the first data transmission or the third data transmission to the base station using the uplink resource.

Aspect 15: A method for wireless communication at a second UE, comprising: receiving, from a base station, a first groupcast DCI message including a first grant for a first set of resources for a first UE for a first data transmission from the first UE and a second grant for a second set of resources for the second UE for a second data transmission from the second UE; transmitting, to the first UE over a resource assigned for feedback, a positive ACK associated with the first data transmission from the first UE; receiving, from the base station over a first downlink resource assigned for feedback, a NACK associated with the second data transmission from the second UE; receiving, from the base station, a second groupcast DCI message based at least in part on transmitting the positive ACK to the first UE and receiving the NACK from the base station; determining a resource assignment for a retransmission of the second data transmission based at least in part on a type of the second groupcast DCI message; and transmitting, to the base station, the retransmission of the second data transmission based at least in part on the resource assignment.

Aspect 16: The method of aspect 15, wherein determining the resource assignment comprises: determining a third grant for a third set of resources for the first UE and a fourth grant for a fourth set of resources for the second UE based at least in part on the type of the second groupcast DCI message.

Aspect 17: The method of aspect 16, wherein determining the resource assignment further comprises: determining that the third grant for the third set of resources is for a third data transmission from the first UE and that the fourth grant for the fourth set of resources is for the retransmission of the second data transmission from the second UE based at least in part on an indication in the second groupcast DCI message.

Aspect 18: The method of aspect 16, wherein determining the resource assignment further comprises: determining that the third grant for the third set of resources is for a retransmission of the first data transmission from the first UE and that the fourth grant for the fourth set of resources is for the retransmission of the second data transmission from the second UE based at least in part on an indication in the second groupcast DCI message.

Aspect 19: The method of any of aspects 16 through 18, further comprising: determining that the third grant assigns a second downlink resource for feedback by the base station associated with a transmission from the first UE over the third set of resources based at least in part on the type of the second groupcast DCI message; and determining that the fourth grant assigns a third downlink resource for feedback by the base station associated with a transmission from the second UE over the fourth set of resources based at least in part on the type of the second groupcast DCI message, wherein determining the resource assignment is based at least in part on determining that the third grant assigns the second downlink resource for feedback by the base station associated with the transmission from the first UE over the third set of resources and that the fourth grant assigns the third downlink resource for feedback by the base station associated with the transmission from the second UE over the fourth set of resources.

Aspect 20: The method of any of aspects 15 through 19, wherein determining the resource assignment comprises: determining a third grant for a third set of resources for one or both of the first UE or the second UE based at least in part on the type of the second groupcast DCI message.

Aspect 21: The method of aspect 20, wherein determining the resource assignment further comprises: determining that the third grant for the third set of resources is for both a retransmission of the first data transmission from the first UE and the retransmission of the second data transmission from the second UE based at least in part on an indication in the second groupcast DCI message.

Aspect 22: The method of aspect 20, wherein determining the resource assignment further comprises: determining that the third grant for the third set of resources is for either of a retransmission of the first data transmission from the first UE or the retransmission of the second data transmission from the second UE based at least in part on an indication in the second groupcast DCI message.

Aspect 23: The method of aspect 22, further comprising: determining that a first channel quality associated with the first UE is less than a second channel quality associated with the second UE based at least in part on the indication, wherein determining the resource assignment is based at least in part on determining that the first channel quality associated with the first UE is less than the second channel quality associated with the second UE.

Aspect 24: The method of aspect 23, wherein determining the resource assignment further comprises: determining that the third grant for the third set of resources is for the retransmission of the second data transmission from the second UE based at least in part on determining that the first channel quality associated with the first UE is less than the second channel quality associated with the second UE.

Aspect 25: The method of any of aspects 20 through 24, further comprising: determining that the third grant assigns a second downlink resource for feedback by the base station associated with a transmission from one or both of the first UE or the second UE over the third set of resources, wherein determining the resource assignment is based at least in part on determining that the third grant assigns the second downlink resource for feedback by the base station associated with the transmission from one or both of the first UE or the second UE over the third set of resources.

Aspect 26: The method of any of aspects 15 through 25, wherein transmitting the retransmission of the second data transmission to the base station comprises: transmitting the retransmission of the second data transmission to the base station using a beamforming technique.

Aspect 27: The method of any of aspects 15 through 26, wherein the first data transmission and the second data transmission comprise identical data originating at the first UE.

Aspect 28: The method of any of aspects 15 through 27, wherein the second grant assigns the second set of resources for the second data transmission from the second UE and assigns the first downlink resource for the feedback by the base station associated with the first data transmission from the second UE.

Aspect 29: A method for wireless communication at a base station, comprising: transmitting, to the first UE and the second UE, a first groupcast downlink control information message including a first grant for a first set of resources for a first UE for a first data transmission from the first UE and a second grant for a second set of resources for a second UE for a second data transmission from the second UE; transmitting, to the first UE over a first downlink resource assigned for feedback, a first negative acknowledgment associated with the first data transmission from the first UE and, to the second UE over a second downlink resource assigned for feedback, a second negative acknowledgment associated with the second data transmission from the second UE; determining a type of a second groupcast downlink control information message based at least in part on a resource assignment for one or more of a retransmission of the first data transmission from the first UE, a third data transmission from the first UE, or a retransmission of the second data transmission from the second UE; transmitting, to the first UE and the second UE, the second groupcast downlink control information message; and receiving, from one or both of the first UE or the second UE, the retransmission of the first data transmission, the third data transmission, or the retransmission of the second data transmission based at least in part on the type of the second groupcast downlink control information message.

Aspect 30: The method of aspect 29, further comprising: determining a third grant for a third set of resources for the first UE and a fourth grant for a fourth set of resources for the second UE, wherein the resource assignment is based at least in part on the third grant being for the first UE and the fourth grant being for the second UE.

Aspect 31: The method of aspect 30, further comprising: assigning the third grant for the third set of resources for the third data transmission from the first UE and the fourth grant for the fourth set of resources for the retransmission of the second data transmission from the second UE; and wherein transmitting the second groupcast downlink control information message comprises: transmitting, in the second groupcast downlink control information message, an indication that the third grant for the third set of resources is for the third data transmission from the first UE and that the fourth grant for the fourth set of resources is for the retransmission of the second data transmission from the second UE.

Aspect 32: The method of aspect 30, further comprising: assigning the third grant for the third set of resources for the retransmission of the first data transmission from the first UE and the fourth grant for the fourth set of resources for the retransmission of the second data transmission from the second UE; and wherein transmitting the second groupcast downlink control information message comprises: transmitting, in the second groupcast downlink control information message, an indication that the third grant for the third set of resources is for the retransmission of the first data transmission from the first UE and that the fourth grant for the fourth set of resources is for the retransmission of the second data transmission from the second UE.

Aspect 33: The method of any of aspects 30 through 32, further comprising: determining a third downlink resource for feedback by the base station associated with a transmission from the first UE over the third set of resources; and determining a fourth downlink resource for feedback by the base station associated with a transmission from the second UE over the second set of resources, wherein the resource assignment is based at least in part on the third downlink resource being for feedback to the first UE and the fourth downlink resource being for feedback to the second UE.

Aspect 34: The method of any of aspects 29 through 33, further comprising: determining a third grant for a third set of resources for one or both of the first UE or the second UE, wherein the resource assignment is based at least in part on the third grant being for one or both of the first UE or the second UE.

Aspect 35: The method of aspect 34, further comprising: assigning the third grant for the third set of resources for both of the retransmission of the first data transmission from the first UE and the retransmission of the second data transmission from the second UE, wherein the resource assignment is based at least in part on assigning the third grant for the third set of resources for both of the retransmission of the first data transmission from the first UE and the retransmission of the second data transmission from the second UE.

Aspect 36: The method of aspect 35, further comprising: combining the retransmission of the first data transmission from the first UE and the retransmission of the second data transmission from the second UE, wherein receiving the retransmission of the first data transmission and the retransmission of the second data transmission is based at least in part on combining the retransmission of the first data transmission from the first UE and the retransmission of the second data transmission from the second UE.

Aspect 37: The method of aspect 34, further comprising: assigning the third grant for the third set of resources for either of the retransmission of the first data transmission from the first UE or the retransmission of the second data transmission from the second UE; and wherein transmitting the second groupcast downlink control information message comprises: transmitting, in the second groupcast downlink control information message, an indication that the third grant for the third set of resources is for either of the retransmission of the first data transmission from the first UE or the retransmission of the second data transmission from the second UE.

Aspect 38: The method of aspect 37, further comprising: determining a first channel quality associated with the first UE and a second channel quality associated with the second UE; determining that the first channel quality is greater than or less than the second channel quality; and determining the indication based at least in part on determining that the first channel quality is greater than or less than the second channel quality, wherein the resource assignment is based at least in part on determining the indication.

Aspect 39: The method of any of aspects 34 through 38, further comprising: determining a third downlink resource for feedback by the base station associated with a transmission from one or both of the first UE or the second UE over the third set of resources, wherein the resource assignment is based at least in part on the third downlink resource being for feedback to one or both of the first UE or the second UE.

Aspect 40: The method of any of aspects 29 through 39, wherein the first data transmission and the second data transmission comprise identical data originating at the first UE and the third data transmission comprises fresh data originating at the first UE.

Aspect 41: An apparatus for wireless communication at a first UE, comprising a processor; memory coupled with the processor; and instructions stored in the memory and executable by the processor to cause the apparatus to perform a method of any of aspects 1 through 14.

Aspect 42: An apparatus for wireless communication at a first UE, comprising at least one means for performing a method of any of aspects 1 through 14.

Aspect 43: A non-transitory computer-readable medium storing code for wireless communication at a first UE, the code comprising instructions executable by a processor to perform a method of any of aspects 1 through 14.

Aspect 44: An apparatus for wireless communication at a second UE, comprising a processor; memory coupled with the processor; and instructions stored in the memory and executable by the processor to cause the apparatus to perform a method of any of aspects 15 through 28.

Aspect 45: An apparatus for wireless communication at a second UE, comprising at least one means for performing a method of any of aspects 15 through 28.

Aspect 46: A non-transitory computer-readable medium storing code for wireless communication at a second UE, the code comprising instructions executable by a processor to perform a method of any of aspects 15 through 28.

Aspect 47: An apparatus for wireless communication at a base station, comprising a processor; memory coupled with the processor; and instructions stored in the memory and executable by the processor to cause the apparatus to perform a method of any of aspects 29 through 40.

Aspect 48: An apparatus for wireless communication at a base station, comprising at least one means for performing a method of any of aspects 29 through 40.

Aspect 49: A non-transitory computer-readable medium storing code for wireless communication at a base station, the code comprising instructions executable by a processor to perform a method of any of aspects 29 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
    receiving, from a base station, a first groupcast downlink control information message including a first grant for a first set of resources for the first UE for a first data transmission from the first UE and a second grant for a second set of resources for a second UE for a second data transmission from the second UE;
    receiving, from the base station over a first downlink resource assigned for feedback, a negative acknowledgment associated with the first data transmission from the first UE and, from the second UE over a resource assigned for feedback, a positive acknowledgment associated with the first data transmission from the first UE;
    receiving, from the base station, a second groupcast downlink control information message based at least in part on receiving the negative acknowledgment from the base station and the positive acknowledgment from the second UE;

determining a resource assignment for one or more of a retransmission of the first data transmission or a third data transmission based at least in part on a type of the second groupcast downlink control information message; and transmitting, to one or both of the second UE or the base station, the retransmission of the first data transmission or the third data transmission based at least in part on the resource assignment.

2. The method of claim 1, wherein determining the resource assignment comprises:

determining a third grant for a third set of resources for the first UE and a fourth grant for a fourth set of resources for the second UE based at least in part on the type of the second groupcast downlink control information message.

3. The method of claim 2, wherein determining the resource assignment further comprises:

determining that the third grant for the third set of resources is for the third data transmission from the first UE and that the fourth grant for the fourth set of resources is for a retransmission of the second data transmission from the second UE based at least in part on an indication in the second groupcast downlink control information message; and wherein transmitting the retransmission of the first data transmission or the third data transmission to the base station comprises:

transmitting, to one or both of the second UE or the base station over the third set of resources, the third data transmission.

4. The method of claim 2, wherein determining the resource assignment further comprises:

determining that the third grant for the third set of resources is for the retransmission of the first data transmission from the first UE and that the fourth grant for the fourth set of resources is for a retransmission of the second data transmission from the second UE based at least in part on an indication in the second groupcast downlink control information message; and wherein transmitting the retransmission of the first data transmission or the third data transmission to the base station comprises:

transmitting, to one or both of the second UE or the base station over the third set of resources, the retransmission of the first data transmission.

5. The method of claim 2, further comprising:

determining that the third grant assigns a second downlink resource for feedback by the base station associated with a transmission from the first UE over the third set of resources based at least in part on the type of the second groupcast downlink control information message; and determining that the fourth grant assigns a third downlink resource for feedback by the base station associated with a transmission from the second UE over the fourth set of resources based at least in part on the type of the second groupcast downlink control information message.

6. The method of claim 1, wherein determining the resource assignment comprises:

determining a third grant for a third set of resources for one or both of the first UE or the second UE based at least in part on the type of the second groupcast downlink control information message.

7. The method of claim 6, wherein determining the resource assignment further comprises:

determining that the third grant for the third set of resources is for both the retransmission of the first data transmission from the first UE and a retransmission of the second data transmission from the second UE based at least in part on an indication in the second groupcast downlink control information message; and wherein transmitting the retransmission of the first data transmission or the third data transmission to the base station comprises:

transmitting, to one or both of the second UE or the base station over the third set of resources, the retransmission of the first data transmission.

8. The method of claim 6, wherein determining the resource assignment further comprises:

determining that the third grant for the third set of resources is for either the retransmission of the first data transmission from the first UE or a retransmission of the second data transmission from the second UE based at least in part on an indication in the second groupcast downlink control information message.

9. The method of claim 8, further comprising:

determining that a first channel quality associated with the first UE is greater than a second channel quality associated with the second UE based at least in part on the indication, wherein determining the resource assignment is based at least in part on determining that the first channel quality is greater than the second channel quality.

10. The method of claim 9, wherein determining the resource assignment further comprises:

determining that the third grant for the third set of resources is for the retransmission of the first data transmission from the first UE based at least in part on determining that the first channel quality associated with the first UE is greater than the second channel quality associated with the second UE; and wherein transmitting the retransmission of the first data transmission or the third data transmission to the base station comprises:

transmitting, to one or both of the second UE or the base station over the third set of resources, the retransmission of the first data transmission.

11. The method of claim 6, further comprising:

determining that the third grant assigns a second downlink resource for feedback by the base station associated with a transmission from one or both of the first UE or the second UE over the third set of resources, wherein determining the resource assignment is based at least in part on determining that the third grant assigns the second downlink resource for feedback by the base station associated with the transmission from one or both of the first UE or the second UE over the third set of resources.

12. The method of claim 1, wherein transmitting the retransmission of the first data transmission or the third data transmission to one or both of the second UE or the base station comprises:

transmitting the retransmission of the first data transmission or the third data transmission to one or both of the second UE or the base station using a beamforming technique.

13. The method of claim 1, wherein the first data transmission and the second data transmission comprise identical data originating at the first UE and the third data transmission comprises fresh data originating at the first UE.

14. The method of claim 1, wherein:
the first set of resources includes a sidelink resource and an uplink resource, and wherein transmitting the retransmission of the first data transmission or the third data transmission comprises transmitting the retransmission of the first data transmission or the third data transmission to the second UE using the sidelink resource and to the base station using the uplink resource; or the first set of resources exclusively includes the uplink resource, and wherein transmitting the retransmission of the first data transmission or the third data transmission comprises transmitting the retransmission of the first data transmission or the third data transmission to the base station using the uplink resource.

15. A method for wireless communication at a second user equipment (UE), comprising:
receiving, from a base station, a first groupcast downlink control information message including a first grant for a first set of resources for a first UE for a first data transmission from the first UE and a second grant for a second set of resources for the second UE for a second data transmission from the second UE;

transmitting, to the first UE over a resource assigned for feedback, a positive acknowledgment associated with the first data transmission from the first UE;

receiving, from the base station over a first downlink resource assigned for feedback, a negative acknowledgment associated with the second data transmission from the second UE;

receiving, from the base station, a second groupcast downlink control information message based at least in part on transmitting the positive acknowledgment to the first UE and receiving the negative acknowledgment from the base station;

determining a resource assignment for a retransmission of the second data transmission based at least in part on a type of the second groupcast downlink control information message; and transmitting, to the base station, the retransmission of the second data transmission based at least in part on the resource assignment.

16. The method of claim 15, wherein determining the resource assignment comprises:
determining a third grant for a third set of resources for the first UE and a fourth grant for a fourth set of resources for the second UE based at least in part on the type of the second groupcast downlink control information message.

17. The method of claim 16, wherein determining the resource assignment further comprises:
determining that the third grant for the third set of resources is for a third data transmission from the first UE and that the fourth grant for the fourth set of resources is for the retransmission of the second data transmission from the second UE based at least in part on an indication in the second groupcast downlink control information message.

18. The method of claim 16, wherein determining the resource assignment further comprises:
determining that the third grant for the third set of resources is for a retransmission of the first data transmission from the first UE and that the fourth grant for the fourth set of resources is for the retransmission of the second data transmission from the second UE based at least in part on an indication in the second groupcast downlink control information message.

19. The method of claim 16, further comprising:
determining that the third grant assigns a second downlink resource for feedback by the base station associated with a transmission from the first UE over the third set of resources based at least in part on the type of the second groupcast downlink control information message; and determining that the fourth grant assigns a third downlink resource for feedback by the base station associated with a transmission from the second UE over the fourth set of resources based at least in part on the type of the second groupcast downlink control information message, wherein determining the resource assignment is based at least in part on determining that the third grant assigns the second downlink resource for feedback by the base station associated with the transmission from the first UE over the third set of resources and that the fourth grant assigns the third downlink resource for feedback by the base station associated with the transmission from the second UE over the fourth set of resources.

20. The method of claim 15, wherein determining the resource assignment comprises:
determining a third grant for a third set of resources for one or both of the first UE or the second UE based at least in part on the type of the second groupcast downlink control information message.

21. The method of claim 20, wherein determining the resource assignment further comprises:
determining that the third grant for the third set of resources is for both a retransmission of the first data transmission from the first UE and the retransmission of the second data transmission from the second UE based at least in part on an indication in the second groupcast downlink control information message.

22. The method of claim 20, wherein determining the resource assignment further comprises:
determining that the third grant for the third set of resources is for either of a retransmission of the first data transmission from the first UE or the retransmission of the second data transmission from the second UE based at least in part on an indication in the second groupcast downlink control information message.

23. The method of claim 22, further comprising:
determining that a first channel quality associated with the first UE is less than a second channel quality associated with the second UE based at least in part on the indication, wherein determining the resource assignment is based at least in part on determining that the first channel quality associated with the first UE is less than the second channel quality associated with the second UE.

24. The method of claim 23, wherein determining the resource assignment further comprises:
determining that the third grant for the third set of resources is for the retransmission of the second data transmission from the second UE based at least in part on determining that the first channel quality associated with the first UE is less than the second channel quality associated with the second UE.

25. The method of claim 20, further comprising:
determining that the third grant assigns a second downlink resource for feedback by the base station associated with a transmission from one or both of the first UE or the second UE over the third set of resources, wherein determining the resource assignment is based at least in part on determining that the third grant assigns the second downlink resource for feedback by the base station associated with the transmission from one or both of the first UE or the second UE over the third set of resources.

26. The method of claim 15, wherein transmitting the retransmission of the second data transmission to the base station comprises:
transmitting the retransmission of the second data transmission to the base station using a beamforming technique.

27. The method of claim 15, wherein the first data transmission and the second data transmission comprise identical data originating at the first UE.

28. The method of claim 15, wherein the second grant assigns the second set of resources for the second data transmission from the second UE and assigns the first downlink resource for the feedback by the base station associated with the first data transmission from the second UE.

29. An apparatus for wireless communication at a first user equipment (UE), comprising:
a processor,
memory coupled with the processor; and
instructions stored in the memory and executable by the processor to cause the apparatus to:
receive, from a base station, a first groupcast downlink control information message including a first grant for a first set of resources for the first UE for a first data transmission from the first UE and a second grant for a second set of resources for a second UE for a second data transmission from the second UE;
receive, from the base station over a first downlink resource assigned for feedback, a negative acknowledgment associated with the first data transmission from the first UE and, from the second UE over a resource assigned for feedback, a positive acknowledgment associated with the first data transmission from the first UE;
receive, from the base station, a second groupcast downlink control information message based at least in part on receiving the negative acknowledgment from the base station and the positive acknowledgment from the second UE;
determine a resource assignment for one or more of a retransmission of the first data transmission or a third data transmission based at least in part on a type of the second groupcast downlink control information message; and
transmit, to one or both of the second UE or the base station, the retransmission of the first data transmission or the third data transmission based at least in part on the resource assignment.

30. An apparatus for wireless communication at a second user equipment (UE), comprising:
a processor,
memory coupled with the processor; and
instructions stored in the memory and executable by the processor to cause the apparatus to:
receive, from a base station, a first groupcast downlink control information message including a first grant for a first set of resources for a first UE for a first data transmission from the first UE and a second grant for a second set of resources for the second UE for a second data transmission from the second UE;
transmit, to the first UE over a resource assigned for feedback, a positive acknowledgment associated with the first data transmission from the first UE;
receive, from the base station over a first downlink resource assigned for feedback, a negative acknowledgment associated with the second data transmission from the second UE;
receive, from the base station, a second groupcast downlink control information message based at least in part on transmitting the positive acknowledgment to the first UE and receiving the negative acknowledgment from the base station;
determine a resource assignment for a retransmission of the second data transmission based at least in part on a type of the second groupcast downlink control information message; and
transmit, to the base station, the retransmission of the second data transmission based at least in part on the resource assignment.

* * * * *